(12) United States Patent
Yaguchi et al.

(10) Patent No.: US 7,191,596 B2
(45) Date of Patent: Mar. 20, 2007

(54) STIRLING ENGINE AND HYBRID SYSTEM THAT USES THE STIRLING ENGINE

(75) Inventors: Hiroshi Yaguchi, Susono (JP); Daisaku Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/939,884

(22) Filed: Sep. 14, 2004

(65) Prior Publication Data

US 2005/0103015 A1    May 19, 2005

(30) Foreign Application Priority Data

Oct. 1, 2003  (JP)  ............... 2003-343415

(51) Int. Cl.
*F01N 5/02* (2006.01)
*F02G 1/04* (2006.01)
*F02G 1/043* (2006.01)
*F02G 1/044* (2006.01)
*F02G 1/053* (2006.01)

(52) U.S. Cl. ............................................. 60/517; 62/6
(58) Field of Classification Search ................. 60/517; 62/6
See application file for complete search history.

(56) References Cited

U.S. PATENT DOCUMENTS

| | | | | |
|---|---|---|---|---|
| 3,845,624 A | * | 11/1974 | Roos ............................ | 60/517 |
| 4,255,929 A | * | 3/1981 | Frosch et al. ................. | 60/517 |
| 4,760,698 A | * | 8/1988 | Bartolini et al. .............. | 60/517 |
| 5,317,874 A | * | 6/1994 | Penswick et al. ............. | 60/517 |
| 5,417,066 A | * | 5/1995 | Kawano et al. ............... | 60/517 |
| 5,857,436 A | * | 1/1999 | Chen ........................... | 60/517 |
| 6,543,229 B2 | | 4/2003 | Johansson | |

FOREIGN PATENT DOCUMENTS

| | | | | |
|---|---|---|---|---|
| DE | 41 37 756 A1 | 2/1993 | | |
| FR | 1 010 210 | 4/1950 | | |
| JP | 49-97139 A | 9/1974 | | |
| JP | 58-192951 A | 11/1983 | ................... | 60/517 |
| JP | 58192951 A | * | 11/1983 | |
| JP | U 4-89836 | 8/1992 | | |
| JP | A 5-5479 | 1/1993 | ................... | 417/11 |
| JP | U 6-60751 | 8/1994 | | |
| JP | A-8-93547 | 4/1996 | | |
| JP | A 2000-146336 | 5/2000 | | |
| JP | A-2001-99003 | 4/2001 | | |

OTHER PUBLICATIONS

Kubota, Dynamics of Mechanism (Kiko Gaku), Fundamental, 1st Edition, Morikita Suppan Co., Ltd. Mar. 18, 1988, pp. 162 to 164.

* cited by examiner

*Primary Examiner*—Hoang Nguyen
(74) *Attorney, Agent, or Firm*—Oliff & Berridge, PLC

(57) ABSTRACT

A Stirling engine includes at least a first cylinder and a second cylinder arranged in serial, and a heat exchanger. The heat exchanger includes a radiator, a regenerator, and a heater. At least a part of the heat exchanger is formed in a curved shape so as to connect between the first cylinder and the second cylinder. The heater is formed in a curved shape so as to connect between the first cylinder and the second cylinder. The radiator and the regenerator are linearly formed along the direction of extension of the cylinder.

16 Claims, 17 Drawing Sheets

| STROKE | 36 | [mm] |
|---|---|---|
| LINK RATIO ( AC:PC ) | 3 | [--] |
| AB | 54 | [mm] |
| AM | 22 | [mm] |
| BM | 32 | [mm] |
| QM | 46.55 | [mm] |
| RB | 110 | [mm] |
| θ | 8.8 ~ -17.9 | [°] |
| φ | 0 ~ 2.2 | [°] |

PRIOR ART

STIRLING ENGINE AND HYBRID SYSTEM THAT USES THE STIRLING ENGINE

BACKGROUND OF THE INVENTION

1) Field of the Invention

The present invention relates to a Stirling engine and a hybrid system that uses the Stirling engine.

2) Description of the Related Art

Stirling engine is an external combustion engine, i.e., in the Stirling engine, a working fluid is heated from outside. The Stirling engines are advantageous over other engines. For example, they has high thermal efficiency. Moreover, in Stirling engines, various types of alternative energies can be effectively used as a heat source for heating the working liquid. For example, even the low temperature difference energies such as solar energy, geothermal energy, or exhaust heat can be used as a heat source, which allows for energy saving.

Japanese Utility Model Application Laid-Open Publication (JP-U) No. H04-89836 discloses a conventional Stirling engine. This Stirling engine is shown in FIG. 21. In this Stirling engine, a high-temperature side cylinder 121 and a low-temperature side cylinder 122 protrude from a machine room 120. One end of a heater 123 is connected to the upper part of the high-temperature side cylinder 121, and the other end is connected to a regenerator 125. A radiator 126 is connected to both the low-temperature side cylinder 122 and the regenerator 125. An expansion piston 127 reciprocates in the high-temperature side cylinder 121 while a compression piston 128 reciprocates in the low-temperature side cylinder 122. The expansion piston 127 and the compression piston 128 are linked to a crankshaft 131 with connecting rods 129 and 130, respectively. Therefore, both the expansion piston 127 and the compression piston 128 reciprocate while mutually having a predetermined phase difference, for example, of 90 degrees.

The heater 123 includes a heat source (not shown) for heating a working fluid. When the working fluid is heated, the working fluid expands. The expansion piston 127 is pressed due to the pressure exerted by the expanded working fluid, which causes a pivotal movement of the crankshaft 131. When the expansion piston 127 is in up stroke position, the working fluid passes through the heater 123 to the regenerator 125. The regenerator 125 includes a heat storage material. The working fluid heats the heat storage material in the regenerator 125 and subsequently flows into the radiator 126 where it is cooled. In the radiator 125, the working fluid is compressed when the compression piston 128 is in up stroke position. The compressed working fluid flows back toward the heater 123 via the regenerator 125 and the heater 123. The working fluid is heated and it expands while it passes through the regenerator 125 and the heater 123.

In the Stirling engine, a space for a heat exchanger including the heater, the regenerator, and the radiator is an invalid capacity that is not directly dedicated to output. An increase in the volume of the heat exchanger results in a decrease in output of the Stirling engine. Therefore, it is desired to make the heat exchanger compact. However, a compact heat exchanger does not perform the heat-exchange effectively. Therefore, if a compact heat exchanger is used, then the engine output decreases.

As explained above, making the heat exchanger compact is contradictory to the increase in the engine output, and therefore, it is necessary to increase efficiency of the heat exchanger in order that the two are made compatible. Therefore, it is desirable to increase the efficiency of the heater.

Some of the Stirling engines are made to operate on exhaust heat such as exhaust gas from an internal combustion engine. However, if such Stirling engine is installed under environments in which it is difficult to ensure sufficient heat, it becomes necessary to efficiently use the available heat.

When the exhaust gas is used to heat the Stirling engine, the place where the Stirling engine can be installed becomes limited. For example, the Stirling engine needs to be installed adjacent to a pipe that carries the exhaust gas from the internal combustion engine. Since there is little space is such places, the Stirling engine must be compact.

Another conventional Stirling engine is disclosed in JP-U No. H04-89836. In this Stirling engine, a high-temperature cylinder and a low-temperature cylinder are arranged in a V-shape. Moreover, a radiator and a regenerator are provided in parallel with the high-temperature cylinder, and a heater is provided between the regenerator and the high-temperature side cylinder. However, because of the V-shape, the Stirling engine becomes bulky and requires more space for installing. Furthermore, the low-temperature cylinder and the radiator are connected to each other at almost a right angle, which is a disadvantage in a channel resistance (flow loss) of the working fluid.

Japanese Patent Application Laid Open Publication (JP-A) No. 2000-146336 also discloses a V-shaped Stirling engine.

JP-U No. H06-60751 and JP-A No. H05-5479 disclose conventional Stirling engines in which a high-temperature cylinder and a low-temperature cylinder are arranged in series. In these Stirling engines, no countermeasures have been taken to efficiently use heat under environments in which it is difficult to ensure sufficient heat. There is also a problem on the channel resistance of the working fluid.

SUMMARY OF THE INVENTION

It is an object of the present invention to provide a compact and effective Stirling engine.

A Stirling engine according to an aspect of the present invention includes at least two cylinders, a first cylinder and a second cylinder, arranged in serial; and a heat exchanger that includes a radiator, a regenerator, and a heater. At least a part of the heat exchanger is formed in a curved shape so as to connect between the first cylinder and the second cylinder.

In the Stirling engine, the heater is formed in the curved shape so as to connect between the first cylinder and the second cylinder. Moreover, the radiator and the regenerator are arranged along a direction in which any one of the first cylinder and the second cylinder extend.

In the Stirling engine, the first cylinder includes a first piston, the second cylinder includes a second piston, and a drive shaft that connects between the first piston and the second piston. An output of the Stirling engine is taken out through the drive shaft. If a first distance is a distance between a top of the first piston and the drive shaft when the first piston is on top dead center, and a second distance is a distance between the top of the second piston and the drive shaft when the second piston is on top dead center, then the first distance is not equal to the second distance.

The Stirling engine further includes a first connecting shaft that connects between a piston pin, which is arranged on the first piston, and the first piston; and a second connecting shaft that connects between a piston pin, which is arranged on the second piston, and the second piston. A difference between the first distance and the second distance corresponds to a difference between lengths of the first connecting shaft and the second connecting shaft.

In the Stirling engine, a difference between the first distance and the second distance corresponds to a difference between lengths of the first piston and the second piston.

In the Stirling engine, one of the two cylinders is a high temperature side cylinder, and a junction plane between the high temperature side cylinder and the heater is substantially in the same plane as a junction plane between the heater and the regenerator.

In the Stirling engine, one of the two cylinders is a high temperature side cylinder, and a junction plane between the high temperature side cylinder and the heater is in substantially the same plane as a junction plane between the regenerator and the radiator.

The Stirling engine further includes an approximate straight-line motion mechanism that is connected to at least one of a first piston of the first cylinder and a second piston of the second cylinder, and that performs an approximate straight-line motion when either of the first piston and the second piston reciprocates in the first cylinder and second cylinder, respectively.

A hybrid system according to another aspect of the present invention includes the above Stirling engine; and an internal combustion engine that drives a vehicle that includes an exhaust system. The Stirling engine is mounted on the vehicle, and the heater of the Stirling engine receives heat from the exhaust system.

In the hybrid system, the heat exchanger connects between upper parts of the first cylinder and the second cylinder. Moreover, the curved shape is set so as to fit in a size such that an internal diameter of an exhaust pipe of the internal combustion engine and a distance between an end of the heater and a top of the heater are substantially equal to each other.

The other objects, features, and advantages of the present invention are specifically set forth in or will become apparent from the following detailed description of the invention when read in conjunction with the accompanying drawings.

DETAILED DESCRIPTION

Exemplary embodiments of a Stirling engine according to the present invention are explained in detail below with reference to the accompanying drawings.

Figure 1:
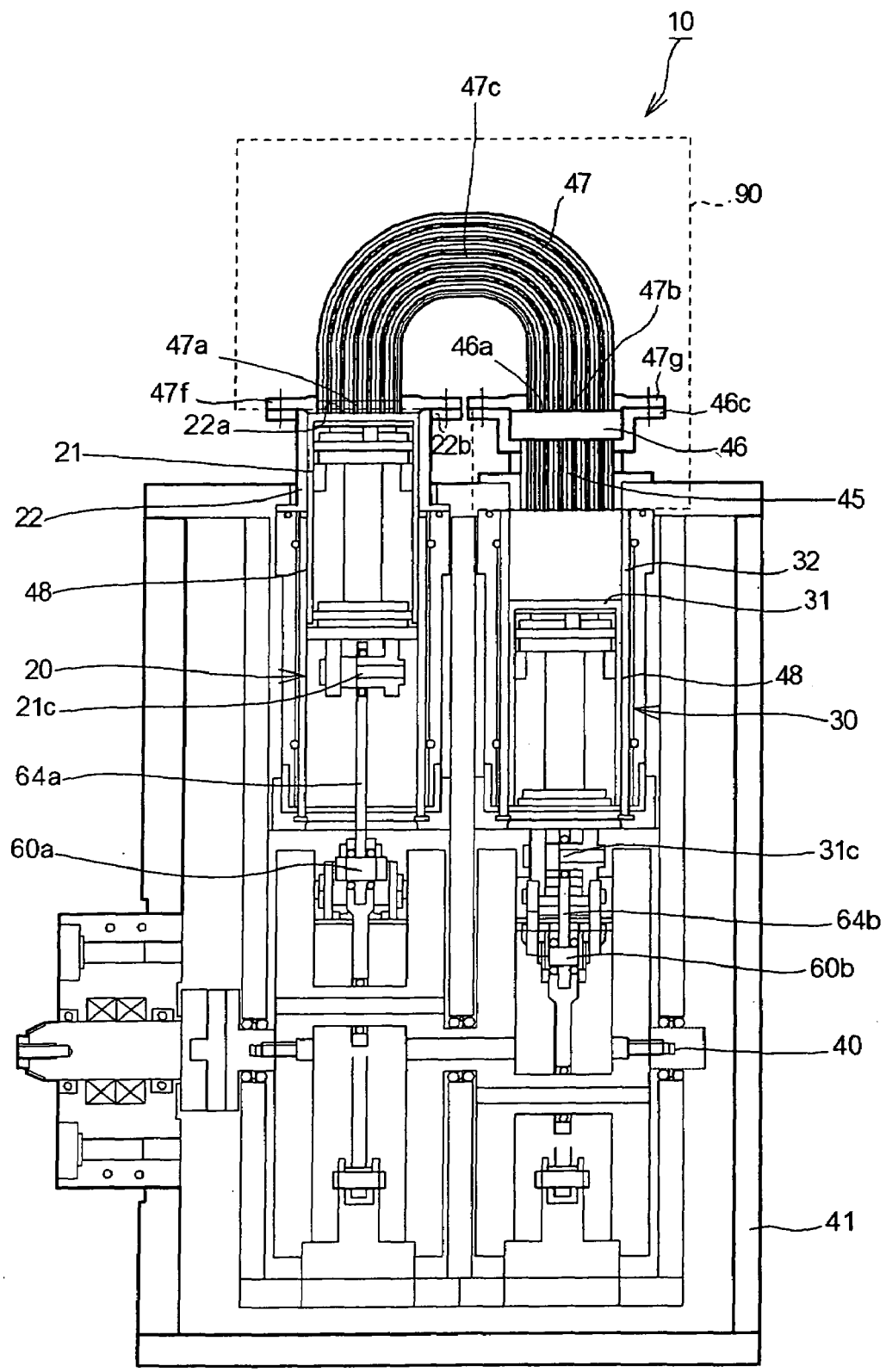
FIG. 1 is a front view of a Stirling engine according to a first embodiment of the present invention.
Figure 2:
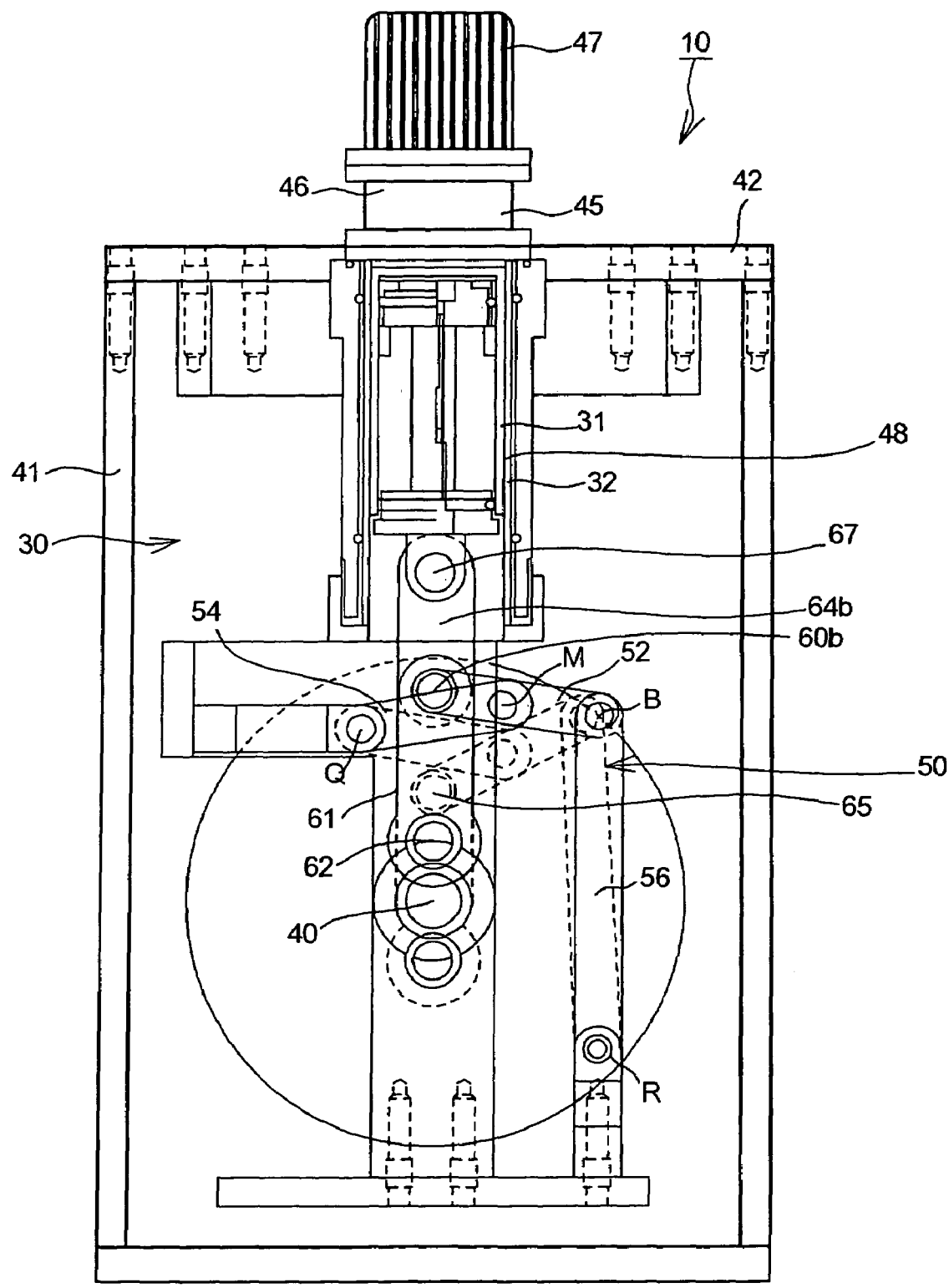
FIG. 2 is a side view of the Stirling engine shown in FIG. 1.

FIG. 1 is a front view of a Stirling engine according to a first embodiment of the present invention. FIG. 2 is a side view of the Stirling engine. As shown in FIG. 1 and FIG. 2, a Stirling engine 10 is an α type (two-piston type) Stirling engine that has two power pistons 20 and 30. The two power pistons 20 and 30 are serially connected (through a heater) to and arranged in parallel with each other (hereinafter, "serial-parallel arrangement"). The power piston 30 is provided on a low temperature side (hereinafter, "low-temperature side power piston 30"), and the power piston 20 is provided on a high temperature side (hereinafter, "high-temperature side power piston 20"). A piston 31 (or a compression piston 31) of the low-temperature side power piston 30 is set to a phase difference so as to move with a delay by about 90 degrees at a crank angle with respect to a piston 21 (or an expansion piston 21) of the high-temperature side power piston 20.

Working fluid heated by a heater 47 flows into a space (expansion space) on the upper part of a cylinder 22 for the high-temperature side power piston 20 (hereinafter, "high-temperature side cylinder"). The working fluid cooled by a radiator 45 flows into a space (compression space) on the upper part of a cylinder 32 for the low-temperature side power piston 30 (hereinafter, "low-temperature side cylinder"). A regenerator 46 stores heat when the working fluid reciprocates between the expansion space and the compression space. In other words, when the working fluid flows from the expansion space to the compression space, the regenerator 46 receives heat from the working fluid and passes heat stored to the working fluid when the working fluid flows from the compression space to the expansion space.

Reciprocating current movement of working medium is caused along with the reciprocation of the two pistons 21 and 31. A proportion of the working fluid in the expansion space of the high-temperature cylinder 22 and the working fluid in the compression space of the low-temperature side cylinder 32 thereby change, and the whole content volume also changes, which causes fluctuations in the pressure. The pressures are compared when the two pistons 21 and 31 are in the same location. When the expansion piston 21 moves down, the pressure is quite higher than the pressure when it moves up. Conversely, when the compression piston 31 moves down, the pressure is lower. Therefore, the expansion piston 21 needs to perform large positive work (expansion work) toward the outside and the compression piston 31 needs to receive the work (compression work) from the outside. A part of the expansion work is used for the compression work, and the rest of it is taken out as an output through a drive shaft 40.

The high-temperature side cylinder 22 and the low-temperature side cylinder 32 are cylindrically formed, and arranged in each upright posture in a crank case 41 that is a rectangular box. The high-temperature side cylinder 22 and the low-temperature side cylinder 32 are fixed to a top surface 42 of the crank case 41. The whole of the low-temperature side cylinder 32 is accommodated inside the crank case 41. A part of the high-temperature side cylinder 22 is accommodated inside the crank case 41, and the rest of it is extended up to the outside of the crank case 41.

The heater 47 is roughly U-shaped, and a first end 47a of the heater 47 is connected to the upper part of the high-temperature side cylinder 22. A second end 47b of the heater 47 is connected to the regenerator 46. The radiator 45 is provided between the upper part of the low-temperature side cylinder 32 and the regenerator 46. Cooling water is used for the radiator 45.

When the average pressure of the working fluid is higher, a pressure difference becomes larger if temperature differences between the working fluid and the radiator 45 and between the working fluid and the heater 47 are the same, and therefore, a higher output can be obtained. As a result, the working fluid in the high-temperature side cylinder 22 and the low-temperature side cylinder 32 is maintained at high pressure. In this embodiment, the overall inside of the crank case 41 is maintained at high pressure. In other words, the crank case 41 functions as a pressurized container.

The pistons 21 and 31 are cylindrically formed. A space between the outer periphery of the expansion piston 21 and the inner periphery of the cylinder 22 is provided as a micro clearance of tens of micrometers. A space between the outer periphery of the piston 31 and the inner periphery of the cylinder 32 is also provided as the micro clearance. The respective clearances contain working fluid (air) for the Stirling engine 10. The pistons 21 and 31 are supported in a non-contact state with respect to the cylinders 22 and 32 by air bearings 48, respectively.

Therefore, a piston ring is not provided around the respective pistons 21 and 31, and lubricating oil that is generally used with the piston ring is not used either. However, a lubricating material is fixed to the inner peripheral surface of the cylinders 22 and 32. The sliding resistance of the working fluid along the air bearing 48 is originally extremely low, but the lubricating material is fixed thereto to further reduce the sliding resistance. As explained above, in each of the air bearings 48, the working fluid keeps each of the expansion space and the compression space airtight, which allows clearance sealing to be performed without using the piston ring and the lubricating oil.

Figure 3:
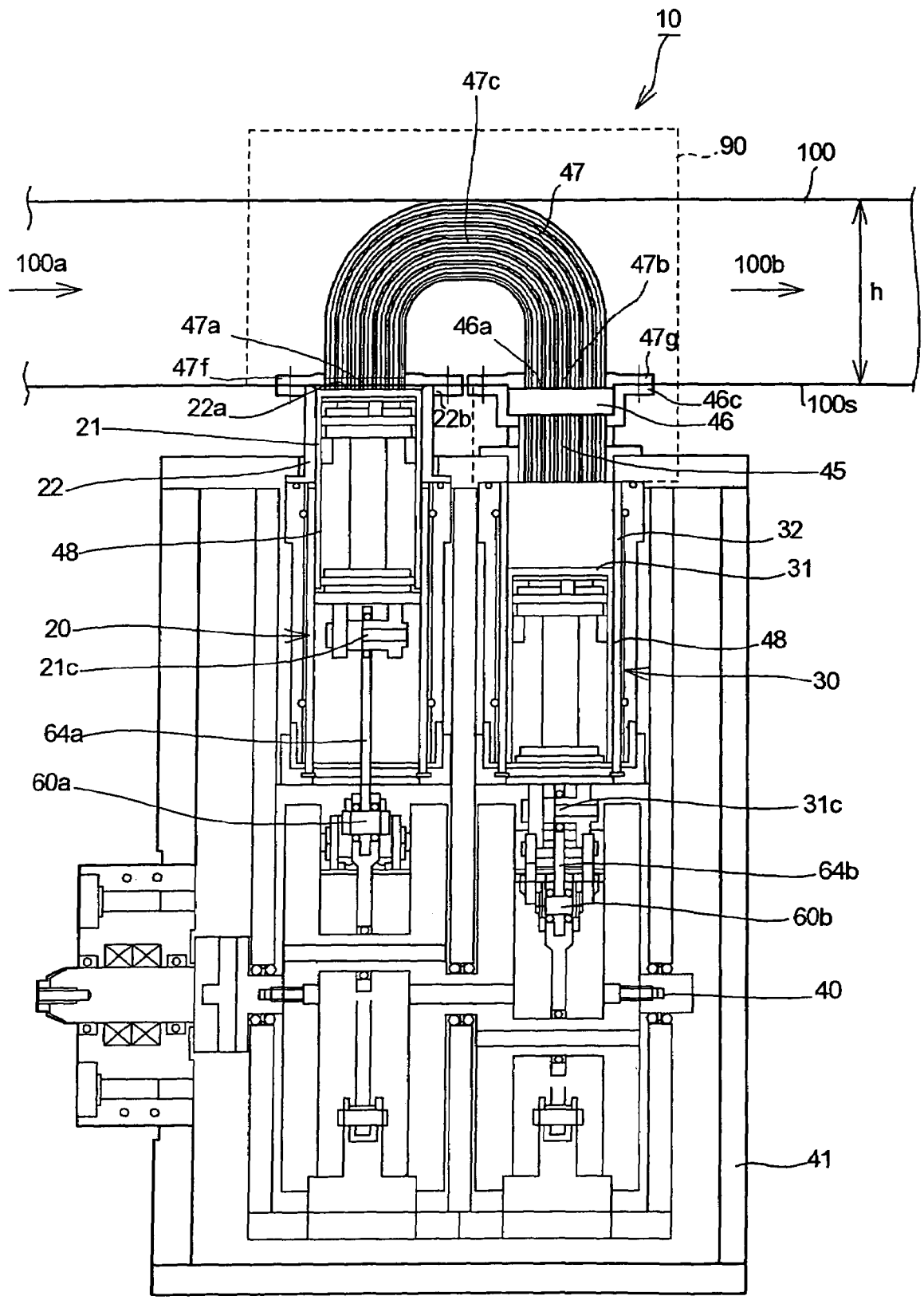
FIG. 3 is a view for explaining how the Stirling engine shown in FIG. 1 is fixed to an exhaust pipe.

The Stirling engine 10 is used together with a gasoline engine (internal combustion engine) in a vehicle to form a hybrid system. In other words, the Stirling engine 10 uses exhaust gas of the gasoline engine as a heat source. As shown in FIG. 3, the heater 47 of the Stirling engine 10 is arranged inside an exhaust pipe 100 of the gasoline engine. The working fluid is heated by heat energy recovered from the exhaust gas, which arrows the Stirling engine to operate.

The Stirling engine 10 is installed in a limited space of the vehicle such that the heater 47 is accommodated inside the exhaust pipe 100. Therefore, if the overall device is more compact, the degree of flexibility of installation is more increased. As a result, in the Stirling engine 10, the V shape is not employed, but the serial-parallel arrangement is employed for the two cylinders 22 and 32.

For arrangement of the heater 47 inside the exhaust pipe 100, the heater 47 on the side of the high-temperature side cylinder 22 is located in an upstream side (near the gasoline engine) 100a where relatively hot exhaust gas flows inside the exhaust pipe 100, while the heater 47 on the side of the low-temperature side cylinder 32 is located in a downstream side (far from the gasoline engine) 100b where relatively cold exhaust gas flows inside the exhaust pipe 100. This is because the side of the high-temperature side cylinder 22 of the heater 47 needs to be heated more.

The heat source of the Stirling engine 10 is exhaust gas of the gasoline engine for the vehicle as explained above, but it is not prepared only for the Stirling engine. Therefore, a heating value to be obtained is not so high. As a result, the heating value of about 800° C. of the exhaust gas is required to operate the Stirling engine. In order to obtain such a heating value, the heater 47 of the Stirling engine 10 has to efficiently receive heat from the exhaust gas in the exhaust pipe 100.

As explained above, the invalid capacity increases when the volume of a heat exchanger 90 including the heater 47, the regenerator 46, and the radiator 45 (See FIG. 1) is large, which results in decrease in the output of the Stirling engine 10. On the other hand, if the volume of the heat exchanger 90 is made compact, heat exchange becomes difficult and the amount of heat received decreases accordingly, which causes the output of the Stirling engine 10 to decrease. From this, in order that the decrease in the invalid capacity and the increase in the amount of heat received are compatible, it is necessary to increase the efficiency of the heat exchanger 90. Therefore, the heater 47 needs to efficiently receive the heat.

To efficiently receive the heat from the exhaust gas in the exhaust pipe 100 and efficiently carry out heat exchange, it is necessary to accommodate the whole of the heater 47 "appropriately" in the exhaust pipe 100 and dispose the radiator 45 outside the exhaust pipe 100 so as not to receive the heat from the exhaust gas. Here, the term "appropriately" indicates that the heater 47 is neither too high nor too low in height with respect to the inside of the exhaust pipe 100. From this, the fixed position of the low-temperature side cylinder 32 is lower than that of the high-temperature side cylinder 22 by at least the height of the radiator 45 based on a fixing surface 100s of the exhaust pipe 100 as a reference. The fixing surface 100s is a plane where the Stirling engine 10 is fixed.

In other words, the position of the compression space formed in the upper part of the low-temperature side cylinder 32 is lower than that of the expansion space formed in the upper part of the high-temperature side cylinder 22. Accordingly, the top dead center of the compression piston 31 is lower than the top dead center of the expansion piston 21.

To change the positions of the top dead centers of the compression piston 31 and the expansion piston 21, extensions (piston supports) 64a and 64b are used to connect between a piston pin 60a and the corresponding piston 21 and between a piston pin 60b and the corresponding piston 31, respectively. The extension 64a connected to the expansion piston 21 is longer than the extension 64b connected to the compression piston 31 by a height such that the position of the top dead center of the expansion piston 21 is higher than the position of the top dead center of the compression piston 31.

The expansion piston 21 and the compression piston 31 are formed so that the heights of the two are equal to each other. More specifically, one of the heights is equal to a distance between the top surface of the piston 21 and a joint 21c with the extension 64a in the piston 21, and the other height is equal to a distance between the top surface of the piston 31 and a joint 31c with the extension 64b in the piston 31, and accordingly, these distances are equal to each other. Therefore, the positions of the top dead centers of the pistons 21 and 31 are changed respectively using the respective extensions 64a and 64b having different lengths. However, even the following structure can be employed. The length of the extension on the side of the expansion piston is made equal to the length of the extension on the side of the compression piston while the heights of the expansion piston and the compression piston are changed differently, which allows the positions of the top dead centers of the two to be changed.

To accommodate the whole of the heater 47 appropriately in the exhaust pipe 100, it is necessary to fix both the first end 47a and the second end 47b of the heater 47 to the fixing surface 100s of the exhaust pipe 100 in a state where a central part 47c of the heater 47 is accommodated in the exhaust pipe 100. In other words, if the position of either the first end 47a or the second end 47b is higher or lower than the fixing surface 100s, the heat-receiving area of the heater 47 cannot be maximized.

By fixing the first end 47a and the second end 47b to the fixing surface 100s to maximize the heat-receiving area, both of the first end 47a and the second end 47b are located in the same plane as the fixing surface 100s. The first end 47a of the heater 47 is connected to an upper surface 22a of the high-temperature side cylinder 22 with no space between the two, while the second end 47b thereof is connected to an upper surface 46a of the regenerator 46 with no space between the two. Therefore, the upper surface 22a of the high-temperature side cylinder 22 is located in the same plane as the upper surface 46a of the regenerator 46.

The first end 47a of the heater 47 and the upper surface 22a of the high-temperature side cylinder 22 are fastened with a fastener such as a bolt so that a flange 47f and a flange 22b are joined with each other. Specifically, the flange 47f is provided near the first end 47a and the flange 22b is provided near the upper surface 22a of the high-temperature side cylinder 22. Likewise, the second end 47b of the heater 47 and the upper surface 46a of the regenerator 46 are fastened with a fastener so that a flange 47g and a flange 46c are joined with each other. Specifically, the flange 47g is provided near the second end 47b, and the flange 46c is provided near the upper surface 46a of the high-temperature side cylinder 22.

Because the upper surface 22a of the high-temperature side cylinder 22 is located in the same plane as the upper surface 46a of the regenerator 46, a junction plane between the flange 47f and the flange 22b is located in the same plane as a junction plane between the flange 47g and the flange 46c. From this, for fixing the Stirling engine 10 to the fixing surface 100s of the exhaust pipe 100, all the flange 47f and the flange 22b including the fixing surface 100s are fastened with the fastener so that the two flanges are joined through the fixing surface 100s. Further, all the flange 47g and the flange 46c including the fixing surface 100s are fastened with the fastener so that the two flanges are joined through the fixing surface 100s. Consequently, the Stirling engine 10 can be easily fixed to the exhaust pipe 100.

A junction (shape in cross section) of the heater 47 with the high-temperature side cylinder 22 is set to the same shape and size as those of an opening (perfect circle) of the upper surface (a junction with the heater 47) of the high-temperature side cylinder 22. Likewise, a junction of the radiator 45 with the low-temperature side cylinder 32 is set to the same shape and size as those of an opening of the upper surface of the low-temperature side cylinder 32.

The upper surface (a junction with the regenerator 46) of the radiator 45 is set to the same shape and size as those of the lower surface of the regenerator 46. A junction of the heater 47 with the regenerator 46 is set to the same shape and size as those of the upper surface of the regenerator 46. In other words, the shape in each cross section of the heater 47, the regenerator 46, and the radiator 45 is formed in the same shape and size as those of each opening of the high-temperature side cylinder 22 and the low-temperature side cylinder 32. This formation allows reduction in the channel resistance of the working fluid.

It is explained above that by accommodating the whole of the heater 47 appropriately in the exhaust pipe 100, both the first end 47a and the second end 47b of the heater 47 are located in one plane, and the upper surface 22a of the high-temperature side cylinder 22 and the upper surface 46a of the regenerator 46 are located in one plane. However, a modification can be made as follows. That is, because the portion to be more heated in the exhaust pipe 100 is the side of the high-temperature side cylinder 22 of the heater 47, the first end 47a of the heater 47 needs to be located in the same plane as the fixing surface 100s in order that the heater 47 is accommodated appropriately in the exhaust pipe 100.

However, in the side of the low-temperature side cylinder 32 of the heater 47, a require for heating is relatively low. Therefore, the second end 47b of the heater 47 may be protruded to the outside of the exhaust pipe 100 if it is a slight amount. In other words, no trouble occurs even if the upper surface 46a of the regenerator 46 is located lower than the upper surface 22a of the high-temperature side cylinder 22.

Because the heat source of the Stirling engine 10 is the exhaust gas of the internal combustion engine for the vehicle, the heating value obtained is limited, and therefore, the Stirling engine 10 has to be operated in a range of the heating value obtained. Therefore, internal friction of the Stirling engine 10 is reduced to a value as low as possible. In order to eliminate friction loss due to the piston ring of which friction loss is the largest of the internal friction in the Stirling engine 10, the piston ring is not used. Instead of this, the air bearing 48 is provided between the cylinder 22 and the piston 21 and between the cylinder 32 and the piston 31, respectively.

Because the sliding resistance is extremely small, the air bearing 48 can largely decrease the internal friction of the Stirling engine. As explained above, the space airtight between the cylinder 22 and the piston 21 and the space airtight between the cylinder 32 and the piston 31 are also maintained using the respective air bearings 48. Therefore, pressurized working fluid is prevented from being leaked when it is expanded or compressed.

The air bearings 48 make the pistons 21 and 31 float in midair, respectively, by using the air pressure (distribution) generated in each micro clearance between the cylinder 22 and the piston 21 and between the cylinder 32 and the piston 31. In the air bearing 48 of the first embodiment, each diameter of the clearances between the respective twos is tens of micrometers. In order to realize the air bearing that makes the object float in midair, means as follows may be used. That is, the means form a portion (pressure gradient) mechanically in which an air pressure becomes high, or another means apply pressurized air (explained later).

The air bearing is not the type that applies the pressurized air, but it is of the type that is used between a cylinder and a piston of a glass injector for medical use.

The use of the air bearing 48 allows elimination of the need for lubricating oil that is used for the piston ring. Therefore, there occurs no such a problem that the heat exchanger 90 (including the regenerator 46 and the heater 47) of the Stirling engine 10 is degraded caused by the lubricating oil. In the first embodiment, it is only required to resolve problems on the sliding resistance and the lubricating oil in the piston ring. Therefore, the bearing is not limited to the air bearing 48, and any gas bearing can be used, excluding for an oil bearing, which uses oil, out of a fluid bearing.

It is also possible to use an aerostatic bearing between the piston 21 and the cylinder 22 and between the piston 31 and the cylinder 32. The aerostatic bearing jets a pressurized fluid to generate static pressure, and thereby floats an object (the pistons 21 and 31 in this embodiment). It is also possible to use an aerodynamic bearing instead of the aerostatic bearing.

When the air bearing 48 is used to reciprocate the pistons 21 and 31 in the cylinders 22 and 32, respectively, straight-line motion precision needs to be set to less than a diameter clearance of the air bearing 48. Moreover, because the loading capacity of the air bearing 48 is low, side force of the pistons 21 and 31 has to be set to virtually zero. In other words, because the air bearing 48 has a low withstanding capacity (withstanding pressure) to force in the diameter direction (horizontal direction, thrust direction) of the cylinders 22 and 32, it is necessary that the straight-line motion precision of the pistons 21 and 31 with respect to the axes of the cylinders 22 and 32 is high.

Particularly, the first embodiment employs the air bearing 48 of the type of floating and supporting an object by using an air pressure in the micro clearance. This type of air bearing 48 has a low withstanding capacity with respect to the force in the thrust direction as compared with the type of applying pressurized air, and therefore, the straight-line motion precision of the piston is required to be higher accordingly.

To take care of this problem, a "grasshopper" type approximate straight-line motion mechanism (approximate straight-line link) 50 is employed for a piston-crank section. In the grasshopper type approximate straight-line motion mechanism 50, a mechanism required for obtaining the same straight-line motion precision is compact as compared with other approximate straight-line motion mechanisms (e.g., Watt's mechanism), which allows the overall device to be compact. Particularly, the Stirling engine 10 according to the first embodiment is installed in a limited space such that the heater 47 is accommodated inside the exhaust pipe of a car. Therefore, if the overall device is more compact, the degree of flexibility of installation increases. The grasshopper type approximate straight-line motion mechanism 50 is advantageous in fuel consumption because the weight of a mechanism required for obtaining the same straight-line motion precision is lighter than other mechanisms. Moreover, the grasshopper type approximate straight-line motion mechanism 50 is easily structured (manufactured or assembled) because the structure of the mechanism is comparatively simpler.

The grasshopper type approximate straight-line motion mechanism 50 is explained below.

A. Outline of Piston-Crank Mechanism

Figure 4A:
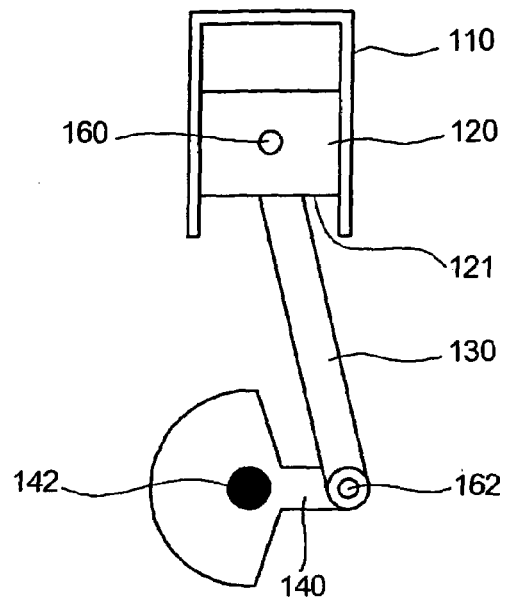
FIG. 4A is a schematic diagram for explaining a conventional piston-crank mechanism.
Figure 4B:
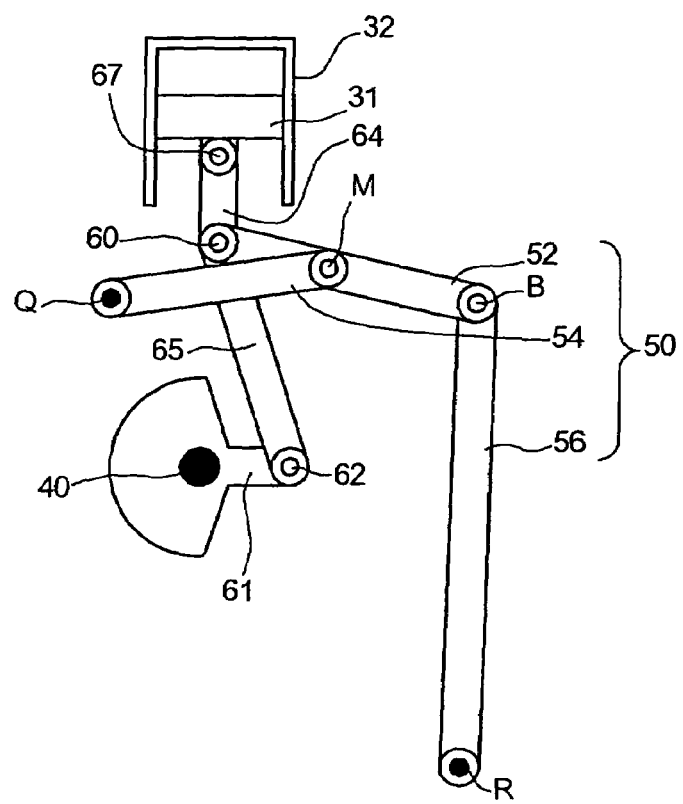
FIG. 4B is a schematic diagram for explaining a piston-crank mechanism in the Stirling engine shown in FIG. 1.

FIG. 4A is a schematic diagram for explaining a piston-crank mechanism in a conventional Stirling engine. FIG. 4B is a schematic diagram for explaining a piston-crank mechanism in the Stirling engine 10 according to the first embodiment. As shown in FIG. 4A, the conventional mechanism includes a cylinder 110, a piston 120, a connecting rod 130, and a crankshaft 140. The piston 120 and the connecting rod 130 are connected to each other with a piston pin 160 at around the center of the piston 120. The connecting rod 130 and the crankshaft 140 are connected to each other with a crank pin 162. When the piston 120 vertically reciprocates, the crankshaft 140 rotates around a shaft 142 (or drive shaft).

FIG. 4B depicts a schematic structure of the piston-crank mechanism of the Stirling engine 10. In the first embodiment, the piston-crank mechanism employs the common structure in the high-temperature side power piston 20 and the low-temperature side power piston 30. Therefore, only the low-temperature side power piston 30 is explained below.

The piston-crank mechanism of the Stirling engine 10 includes the cylinder 32, the piston 31, a connecting rod 65, a crankshaft 61, and the approximate straight-line motion mechanism 50. The approximate straight-line motion mechanism 50 is the grasshopper type approximate straight-line motion mechanism, as explained above.

As shown in FIG. 2 and FIG. 4B, the piston 31 is connected with the piston support 64b. The piston 31 and the piston support 64b are formed as separate units. The lower end of the piston 31 and the upper end of the piston support 64 are pivotally connected to each other with a pin 67. The piston support 64 and the connecting rod 65 are connected to each other with a piston pin 60 at the lower end of the piston support 64. The connecting rod 65 and a crankshaft 61 are connected to each other with a crank pin 62. When the piston 31 vertically reciprocates, the crankshaft 61 rotates around a shaft 40 (or drive shaft).

The approximate straight-line motion mechanism 50 includes first and second horizontal links 52 and 54 and one vertical link 56. One end of the first horizontal link 52 is pivotally connected to the lower end of the piston support 64 at the piston pin 60. One end of the second horizontal link 54 is pivotally connected to the first horizontal link 52 at a predetermined position in the middle of the first horizontal link 52. The other end of the second horizontal link 54 is pivotally fixed to a predetermined position of the piston-crank mechanism. One end of the vertical link 56 is pivotally connected to the first horizontal link 52 at an end opposite to the piston pin 60 of the first horizontal link 52. The other end of the vertical link 56 is pivotally fixed to a predetermined position of the piston-crank mechanism.

As shown in FIG. 4A and FIG. 4B, each of joint portions (e.g., drive shaft 40) indicated by a solid circle rotates or pivots around an axis of this portion, but it is not a joint at which a relative position to the cylinder 32 is not changed (hereinafter, "fulcrum"). Furthermore, each of joint portions (e.g., piston pin 60) indicated by a hollow circle rotates or pivots around an axis of this portion, and it is a joint at which a relative position to the cylinder 32 is changed (hereinafter, "moving joint"). Here, "to rotate" means rotation in a range of 360 degrees or more, while "to pivot" means rotation in a range of less than 360 degrees.

Of the Stirling engine 10 according to the first embodiment, components other than the piston-crank mechanism and the cylinder 32 are omitted in FIG. 4A and FIG. 4B.

Figure 5A:
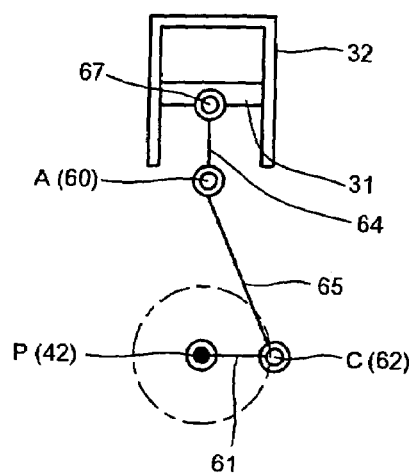
FIG. 5A to FIG. 5C are schematic diagrams for explaining link structures of the piston-crank mechanism shown in FIG. 4B.
Figure 5B:
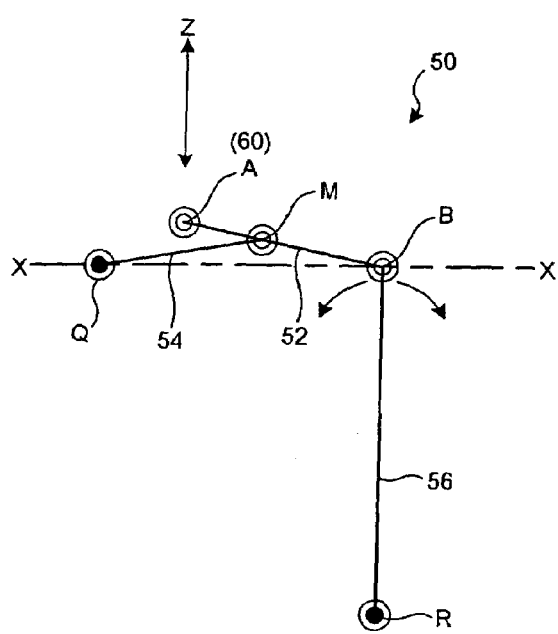
Figure 5C:
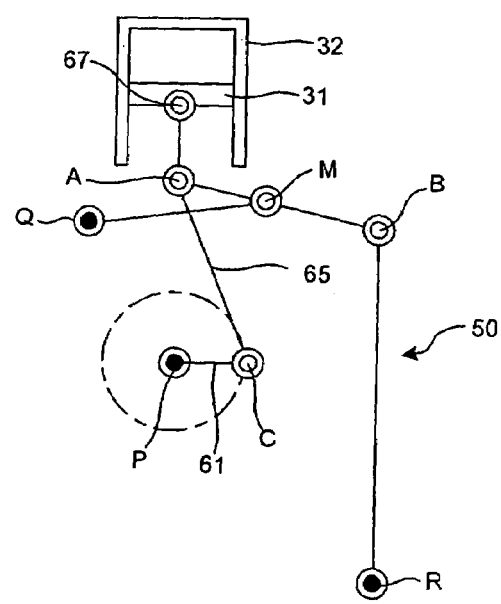

FIG. 5A to FIG. 5C are schematic diagrams for explaining link structures of the piston-crank mechanism according to the first embodiment. FIG. 5A depicts only the cylinder 32, the piston 31, the connecting rod 65, and the crankshaft 61. FIG. 5B depicts only the approximate straight-line motion mechanism 50. FIG. 5C depicts a mechanism the same as that of FIG. 4B, and a combination of the structures of FIG. 5A and FIG. 5B.

As shown in FIG. 5A and FIG. 5C, various joints are represented as follows:
(1) Moving joint A: a central axis of the piston pin 60 (FIG. 4B).
(2) Moving joint B: a joint at an end opposite to the moving joint A of the first horizontal link 52.
(3) Moving joint C: a joint at an end opposite to the moving joint A of the connecting rod 65.
(4) Moving joint M: a joint in an intermediate point of the first horizontal link 52.
(5) Fulcrum P: a central axis of the crankshaft 61 (drive shaft).
(6) Fulcrum Q: a joint at an end opposite to the moving joint M of the second horizontal link 54.
(7) Fulcrum R: a joint at an end opposite to the moving joint B of the vertical link 56.

The moving joint A is the central axis of the piston pin 60, and moves along a vertical direction Z (FIG. 5B) with reciprocation of the piston 31. In this specification, the vertical direction Z indicates a direction along a central line (or axial center) in the axial direction of the cylinder 32. The moving joints A and B are joints at both ends of the first horizontal link 52. The moving joint B moves on a circular-arc locus following pivotal movement of the vertical link 56 around the fulcrum R. The moving joint B is set so as to be in substantially the same location in the vertical direction as a location X indicating that the fulcrum Q of the second horizontal link 54 vertically moves.

If the length of the vertical link 56 is virtually set to infinity and the moving joint B linearly moves along the location X in the vertical direction the same as the location of the fulcrum Q, the moving joint A motions similarly to a perfect straight line along the vertical direction Z. In actuality, however, the length of the vertical link 56 is limited, and therefore the moving joint A moves on the locus slightly deviating from the straight-line motion (this is explained later).

An almost perfect straight-line motion mechanism can be realized if a guide that linearly guides the moving joint B is employed instead of the vertical link 56, but friction between the guide and the moving joint B increases. Therefore, the approximate straight-line motion mechanism 50 according to the first embodiment is preferable to the perfect straight-line motion mechanism from the viewpoint of reduction in the friction.

The position of the moving joint M in the middle of the first horizontal link 52 is set so as to satisfy the following relationship.

$$AM \times QM = BM^2$$

Where AM is a distance between the joints A and M, QM is a distance between the joints Q and M, and BM is a distance between the joints B and M.

Figure 6A:
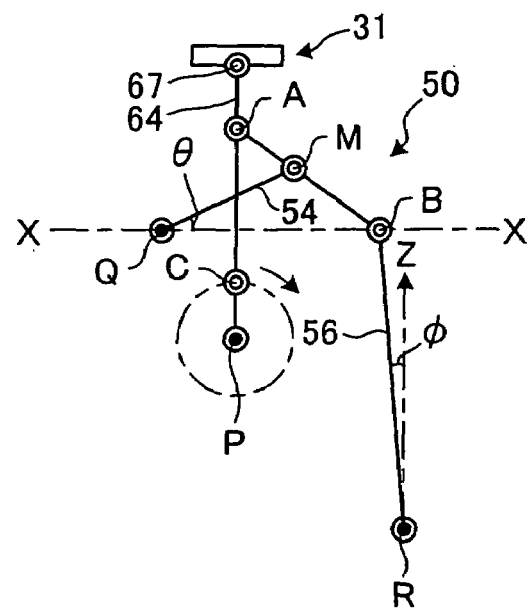
FIGS. 6A to 6D are schematic diagrams for explaining a change in the form of the piston-crank mechanism shown in FIG. 4B with movement of a piston.
Figure 6B:
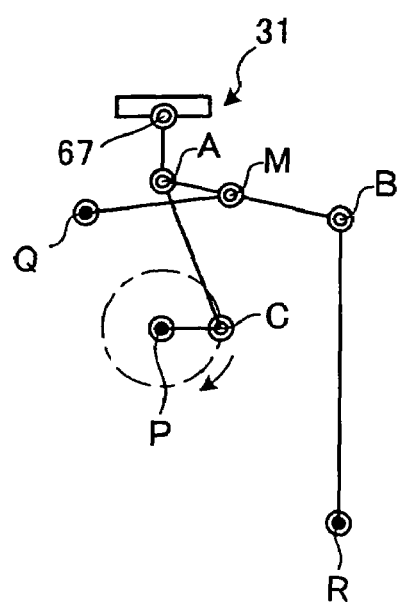

FIG. 6A to FIG. 6D depict how the form of the piston-crank mechanism changes in association with movement of the piston 31. It is clear that, of the three moving joints A, B, and M of the approximate straight-line motion mechanism 50, the moving joints A and M move quite largely with movement of the piston 31 but the moving joint B at the upper end of the vertical link 56 does not move so much. First and second angles θ and φ are shown in FIG. 6A. The two angles can be used as an index indicating how the form of the approximate straight-line motion mechanism 50 changes. The first angle θ is an angle ∠MQX of the second horizontal link 54 measured from the horizontal direction X. The second angle φ is a tilt angle ∠BRZ of the vertical link 56 from the vertical direction Z. Each range of the values of these angles θ and φ depends on the setting of a range of movement (i.e., a stroke of the piston 31) of the moving joint A and the length of each link in the approximate straight-line motion mechanism 50.

As explained above, the lower end of the piston 31 ad the upper end of the piston support 64 are pivotally connected to each other with the pin 67. In this structure, even if the locus of the lower end of the piston support 64 slightly deviates from the straight line, the deviation does not act as force that makes the piston 31 inclined, which is one of advantages. In other words, the deviation of the lower end of the piston support 64 hardly affects the piston 31. That is, in order to accommodate the deviation from the straight-line motion occurring when the grasshopper type approximate straight-line motion mechanism 50 reciprocates, the piston 31 and the piston support 64 are connected to each other not rigidly but relatively movably (freely).

The pin 67 is used to connect between the two as an example. As a result, the work of assembling the piston to the approximate straight-line motion mechanism and the connecting rod becomes easier as compare to the case where the piston and the piston support are integrally formed, which is another advantage. On the other hand, when the piston support 64 and the piston 31 are integrated into one unit, even if the piston 31 is slightly inclined with respect to the cylinder 32 for some reason, the inclination is corrected when the piston support 64 puts in approximate straight-line motion, which is still another advantage.

Figures 7A, 7B:
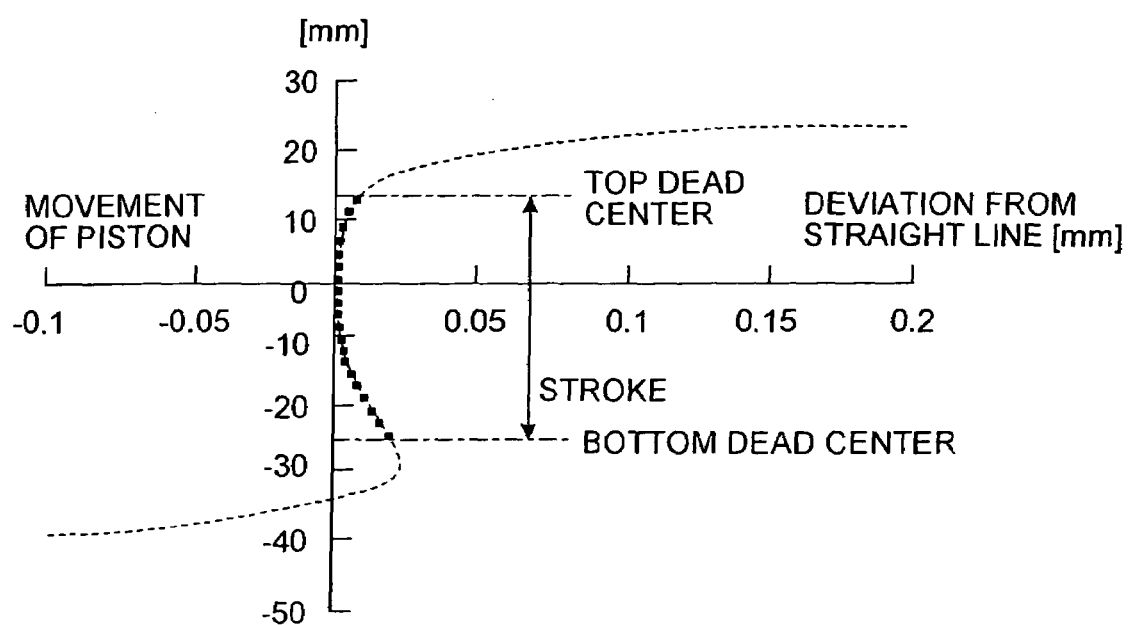
FIG. 7A is a diagram for explaining an example of specific dimensions of the piston-crank mechanism shown in FIG. 4B.
FIG. 7B is a diagram for explaining a locus of a moving joint A.

FIG. 7A is a diagram for explaining an example of specific dimensions of the piston-crank mechanism according to the first embodiment. FIG. 7B is a diagram for explaining a locus of the moving joint A. It is clear that the dimensions as shown in FIG. 7A satisfy the relationship $(AM \times QM = BM^2)$. As shown in FIG. 7B, the locus of the moving joint A includes an approximate straight-line portion, and this approximate straight-line portion is used as a range of a stroke of the piston 31. In this case, the range of the stroke of the piston 31 is set so that the amount of deviation from the straight line on the top dead center is smaller than that on the bottom dead center.

The term "straight line" in the expression of "the amount of deviation from the straight line" indicates the central line in the axial direction of the cylinder 32. In the example of FIG. 7B, the amount of deviation on the top dead center is about 5 micrometers, and the amount of deviation on the bottom dead center is about 20 micrometers. It is noted that these values are obtained through measurement under the ordinary temperature.

The reason that the amount of deviation of the moving joint A from the straight line on the top dead center is set so as to be smaller than the amount of deviation on the bottom dead center is as follows. This is because the force due to the compressed air near the top dead center is exerted on the piston 31 (likewise, in the high-temperature side power piston 20, the force due to the expanded air near the top dead center is applied to the piston 21). In other words, if the amount of deviation on the top dead center is smaller, the thrust (the force in the horizontal direction) exerted on the piston 31 by the force due to the compressed air (or on the piston 21 by the force due to the expanded air) becomes smaller. Therefore, the friction between the piston 31 and the cylinder 32 (or between the piston 21 and the cylinder 22) can be reduced. On the other hand, the force due to the compressed air (or the force due to the expanded air) is not exerted on the piston 31 on the bottom dead center. Therefore, even if a slight deviation occurs, the deviation does not much affect the friction as compared with that on the top dead center.

It is possible to make the approximate straight-line portion in the locus of the moving joint A longer by making each length of the links 52, 54, and 56 longer. However, if the link is made longer, the size of the approximate straight-line motion mechanism 50 becomes larger. In other words, there is a trade-off relationship between the amount of deviation from the straight line on the top dead center and the bottom dead center and the size of the approximate straight-line motion mechanism 50. Considering these points, it is preferable to structure the approximate straight-line motion mechanism 50 so that the amount of deviation of the moving joint A from the straight line on the top dead center of the piston 31 is about 10 micrometers or less by measurement under the normal temperature. It is also preferable that the amount of deviation on the bottom dead center is about 20 micrometers or less.

Figure 6C:
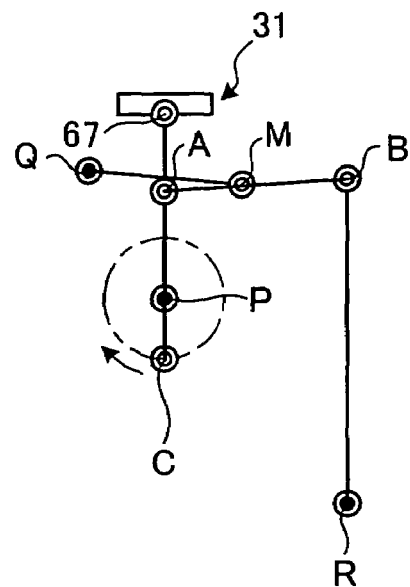
Figure 6D:
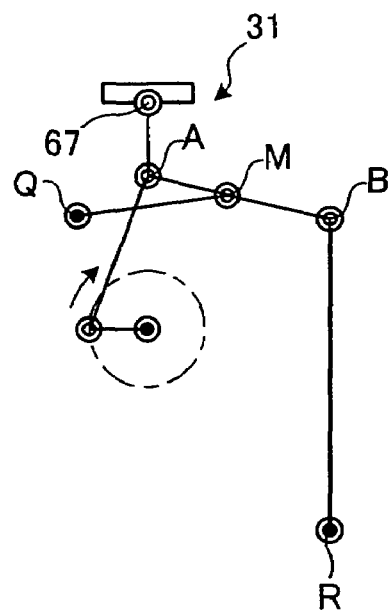

As shown in FIG. 7B, when the range of the stroke of the piston 31 is set, the angle θ of the second horizontal link 54 includes values in a range between 8.8 degrees and −17.9 degrees (FIG. 7A). The maximum value (8.8 degrees) of the angle θ corresponds to the case where the piston 31 is on the top dead center (FIG. 6A), while the minimum value (−17.9 degrees) thereof corresponds to the case where the piston 31 is on the bottom dead center (FIG. 6C).

The angle φ of the vertical link 56 takes values in a range between 0 degree and 2.2 degrees. The minimum value (0 degrees) of the angle φ corresponds to the case where the joints Q, A, M, and B lie on almost a straight line. The maximum value (2.2 degrees) corresponds to the case where the absolute value of the angle θ is the largest (the bottom dead center in this case). It is noted that the ranges of the values of the angles θ and φ depend on the dimensions of the links in the approximate straight-line motion mechanism 50 and the setting of the stroke range of the piston 31.

B. Example of Specific Form

Figure 8:
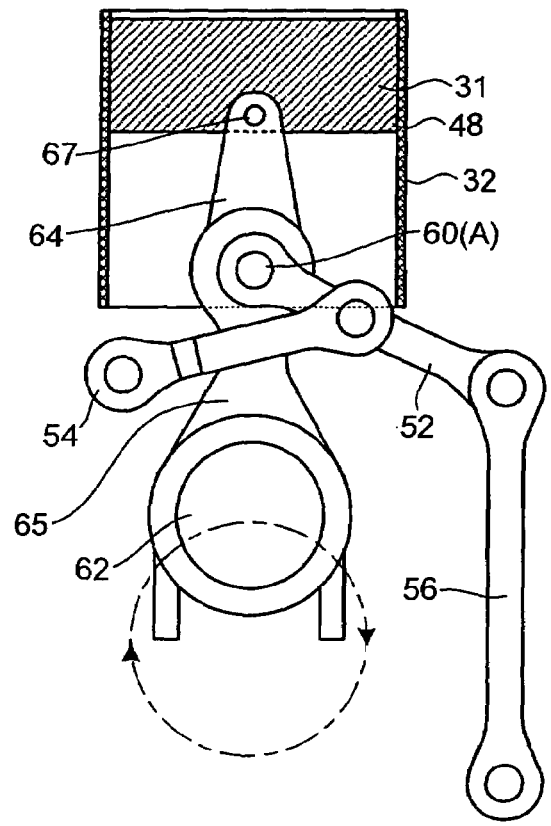
FIG. 8 is a longitudinal section of the piston-crank mechanism shown in FIG. 4B.
Figure 9:
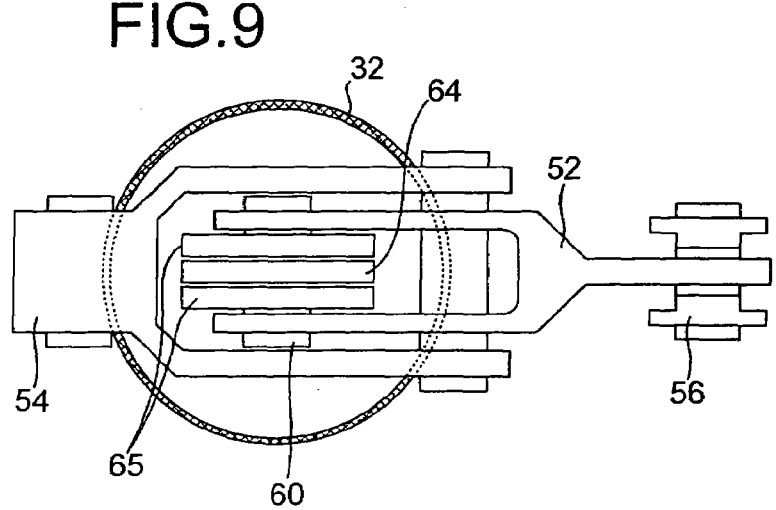
FIG. 9 is a cross section of the piston-crank mechanism shown in FIG. 8.

FIG. 8 and FIG. 9 depict examples of a specific form of the piston-crank mechanism according to the first embodiment. The piston 31 is cylindrically formed. A groove for a piston ring and the piston ring are not provided along the outer peripheral surface of the piston 31. The shape of the piston 31 in a planar view (cross section) is formed in a perfect circle with high precision. The cylinder 32 is also cylindrically formed, and the shape of the inner periphery of the cylinder 32 in the planar view is also formed in a perfect circle with high precision. As explained above, the air bearing 48 is provided between the outer peripheral surface of the piston 31 and the inner periphery of the cylinder 32. Because of the perfect circles in the respective planar views of the piston 31 and the inner periphery of the cylinder 32, the air bearing 48 with excellent sealing capability can be realized.

The piston support 64 is provided between the piston pin 60 and the piston 31 to maintain a predetermined distance or more between the two. By forming the space between the two by the predetermined distance or more using the piston support 64, the piston 31 and the approximate straight-line motion mechanism 50 can be prevented from contacting each other when the piston 31 reciprocates.

The length of the piston support 64 is preferably set so that the length from the upper end of the piston 31 to the piston pin 60 is a value ranging between about ½ time or more of the stroke of the piston 31 and less than one time. The reason is that if the length of the piston support 64 is too short, the approximate straight-line motion mechanism 50 may collide against the cylinder 32 or the piston 31 on the top dead center. Another reason is that if the length of the piston support 64 is too long, the energy loss increases by the amount of increase in its weight.

As shown in FIG. 9, the piston support 64, the connecting rod 65, and the first and the second horizontal links 52 and 54 are structured so as not to interfere with each other even when the piston 31 vertically moves. More specifically, in the example of FIG. 9, the piston support 64 is provided at the center in the axial direction of the cylinder 32 and is sandwiched between two plate-like members of the connecting rod 65. Arranged on the outside of the connecting rod 65 are two plate-like members of the first horizontal link 52.

These three types of members 64, 65, and 52 are joined with each other with the piston pin 60. Two plate-like members of the second horizontal link 54 are further arranged outside of the first horizontal link 52. In other words, in this example, each of the connecting rod 65 and the two horizontal links 52 and 54 has a bifurcated structure such that the end of each component is branched into two plate-like members, and the respective two plate-like members are arranged at positions so that the piston support 64 is sandwiched between the two.

Figure 10:
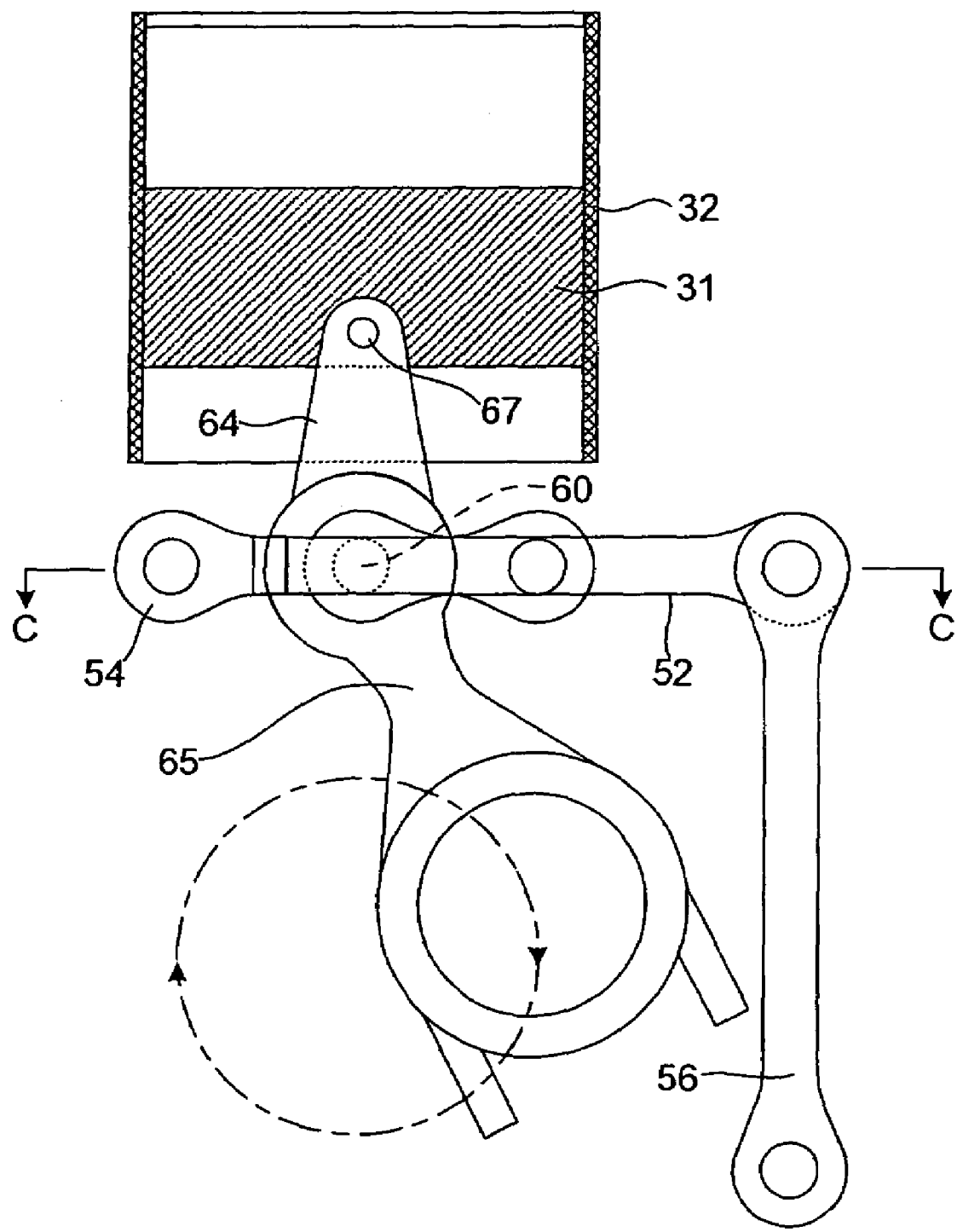
FIG. 10 is a longitudinal section of the piston-crank mechanism shown in FIG. 4B when the crank is rotated.
Figure 11:
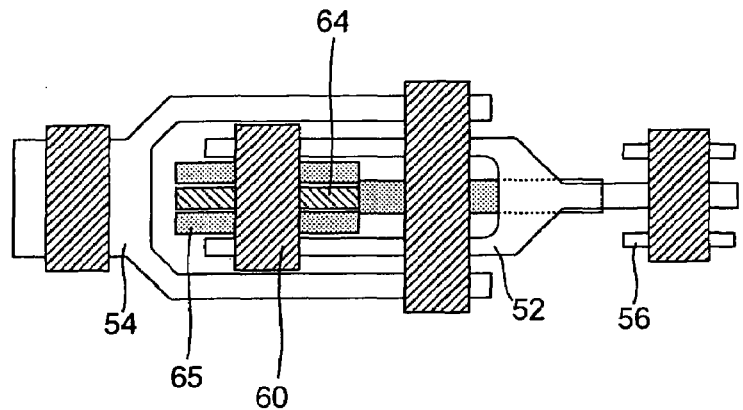
FIG. 11 is a cross section of the piston-crank mechanism shown in FIG. 10.

FIG. 10 is a longitudinal section of the piston-crank mechanism when the crank rotates from the state of FIG. 8 and the horizontal links 52 and 54 lie in the horizontal direction. FIG. 11 is a cross section taken along the line C—C of FIG. 10. It is noted that the connecting rod 65 is indicated by dots and the piston support 64 is indicated by hatching in FIG. 11 to FIG. 16 for convenience in explanation.

Figure 12:
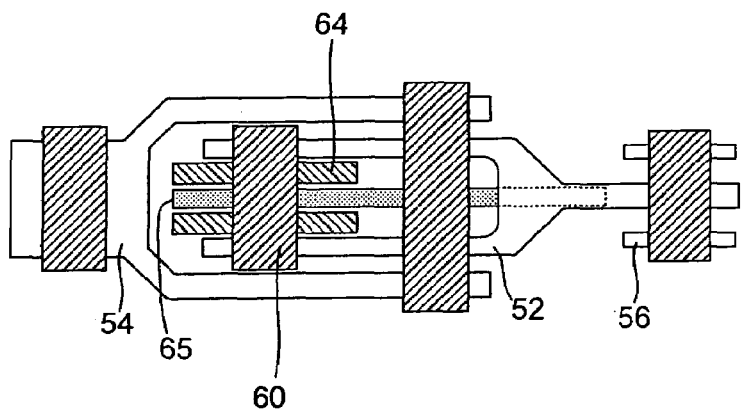
FIG. 12 is a cross section of a modification of a joint portion in the piston-crank mechanism shown in FIG. 4B.

FIG. 12 to FIG. 16 depict various possible forms and positional relationships (joined states) among the piston support 64, the connecting rod 65, and the first horizontal link 52. The arrangement of FIG. 12 is obtained by reversing the positional relationship between the connecting rod 65 and the piston support 64 in the arrangement of FIG. 11. In other words, as shown in FIG. 12, the connecting rod 65 is arranged at the center, the bifurcated structure part of the piston support 64 is arranged outside the connecting rod 65, and the bifurcated structure part of the first horizontal link 52 is further arranged outside the piston support 64. The bifurcated structure part of the second horizontal link 54 is arranged on the outermost position.

Figure 13:
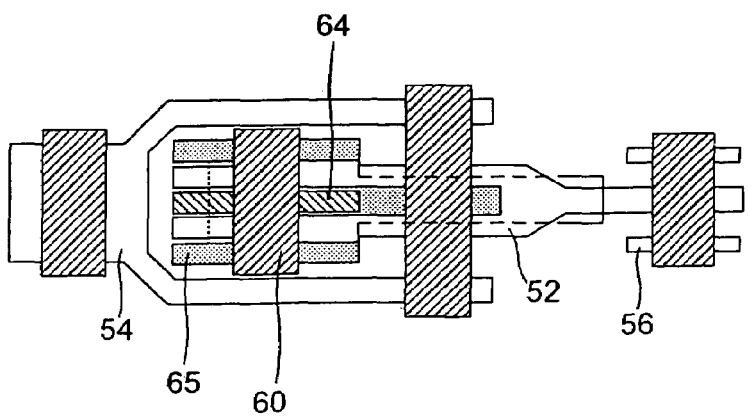
FIG. 13 is a cross section of another modification of a joint portion in the piston-crank mechanism shown in FIG. 4B.

The arrangement of FIG. 13 is obtained by reversing the positional relationship between the connecting rod 65 and the first horizontal link 52 in the arrangement of FIG. 11. In other words, as shown in FIG. 13, the piston support 64 is arranged at the center, the bifurcated structure part of the first horizontal link 52 is arranged outside the piston support 64, and the bifurcated structure part of the connecting rod 65 is further arranged outside the first horizontal link 52.

Figure 14:
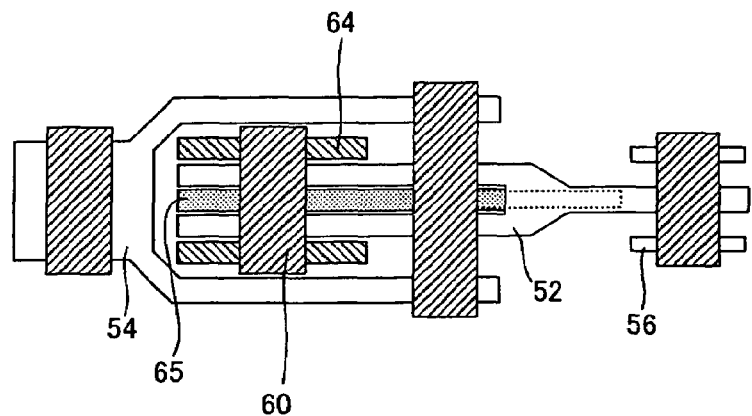
FIG. 14 is a cross section of still another modification of a joint portion in the piston-crank mechanism shown in FIG. 4B.

The arrangement of FIG. 14 is obtained by reversing the positional relationship between the piston support 64 and the first horizontal link 52 in the arrangement of FIG. 12. In other words, as shown in FIG. 14, the connecting rod 65 is arranged at the center, the bifurcated structure part of the first horizontal link 52 is arranged outside the connecting rod 65, and the bifurcated structure part of the piston support 64 is further arranged outside the first horizontal link 52.

Figure 15:
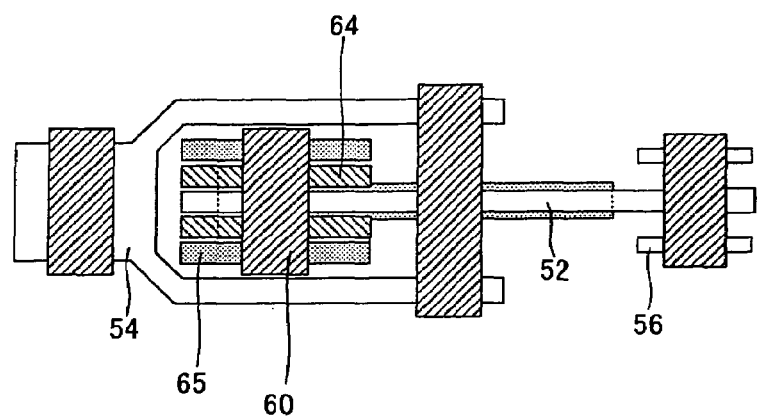
FIG. 15 is a cross section of still another modification of a joint portion in the piston-crank mechanism shown in FIG. 4B.

The arrangement of FIG. 15 is obtained by reversing the positional relationship between the piston support 64 and the first horizontal link 52 in the arrangement of FIG. 13. In other words, as shown in FIG. 15, the first horizontal link 52 is arranged at the center, the bifurcated structure part of the piston support 64 is arranged outside the first horizontal link 52, and the bifurcated structure part of the connecting rod 65 is further arranged outside the piston support 64.

Figure 16:
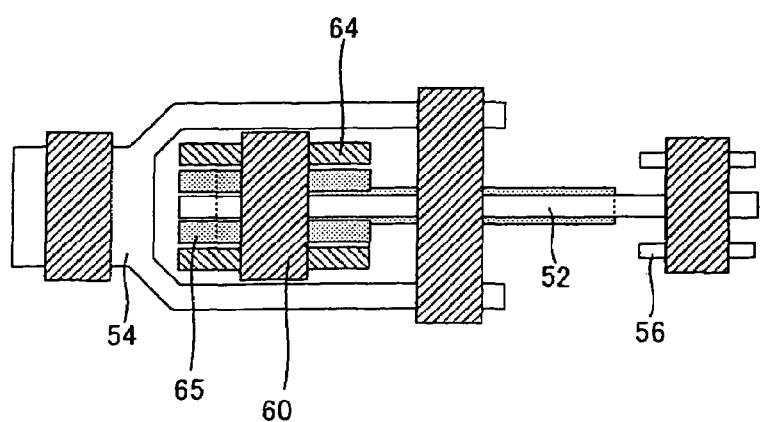
FIG. 16 is a cross section of still another modification of a joint portion in the piston-crank mechanism shown in FIG. 4B.

The arrangement of FIG. 16 is obtained by reversing the positional relationship between the piston support 64 and the connecting rod 65 in the arrangement of FIG. 15. In other words, as shown in FIG. 16, the first horizontal link 52 is arranged at the center, the bifurcated structure part of the connecting rod 65 is arranged outside the first horizontal link 52, and the bifurcated structure part of the piston support 64 is further arranged outside the connecting rod 65.

In all the structures of FIG. 11 to FIG. 16, the end of the second horizontal link 54 has a bifurcated structure and it is arranged outside the other members 64, 65, 52, and 60. When the approximate straight-line motion mechanism operates, the end of the first horizontal link 52 passes through the space between the two ends branched of the bifurcated structure of the second horizontal link 54. With this structure, even if the connecting rod 65 is made shorter, the first horizontal link 52 and the second horizontal link 54 do not interfere against each other. Therefore, the increase in the dimensions of the piston-crank mechanism in the vertical direction can be suppressed.

In the structures of FIG. 11 to FIG. 16, the end of the first horizontal link 52, the lower end of the piston support 64 (lower end of the piston), and the upper end of the connecting rod 65 are joined with one piston pin 60. In such a structure, the first horizontal link 52, the piston support 64, and the connecting rod 65 are joined with one piston pin 60, which makes the structure of the joint portion simpler and more compact.

In the structures of FIG. 11 to FIG. 16, two ends of the three ends each have a bifurcated structure. The three ends are the end of the first horizontal link 52, the lower end of the piston support 64, and the upper end of the connecting rod 65. The rest of them is arranged at the center of the bifurcated structures of the two ends. In such a structure, the first horizontal link 52, the piston support 64, and the connecting rod 65 become symmetrical in the joint portion thereof. Therefore, it is possible to prevent occurrence of side force due to an asymmetrical form therein.

The positional relationship among the members 64, 65, 52, and 54 can be changed to any positional relationship other than the positional relationships as shown in FIG. 11 to FIG. 16.

Figure 17A:
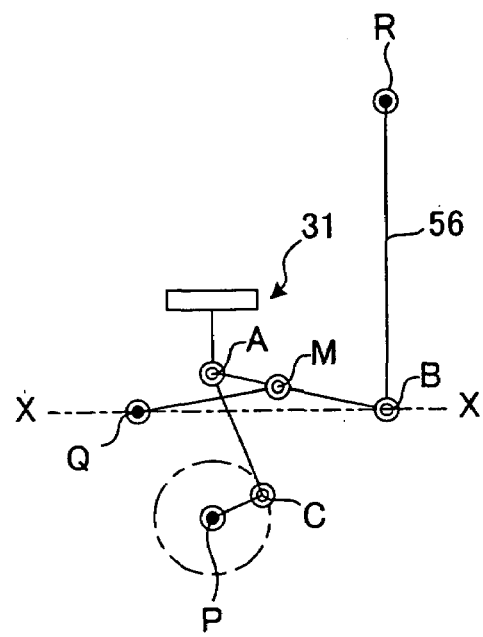
FIGS. 17A to 17C are schematic diagrams for explaining still another modification of the piston-crank mechanism shown in FIG. 4B.
Figure 17B:
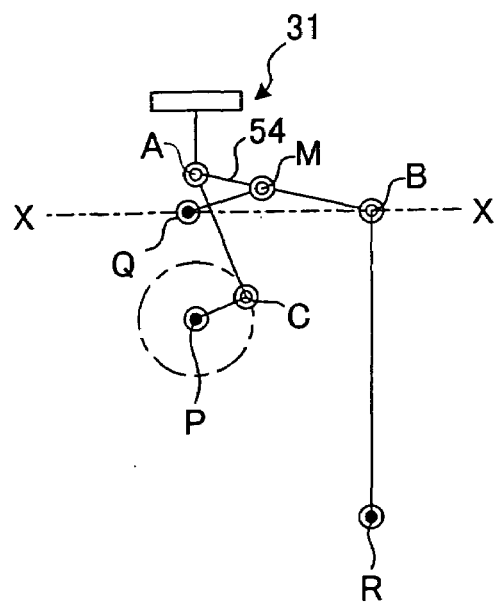
Figure 17C:
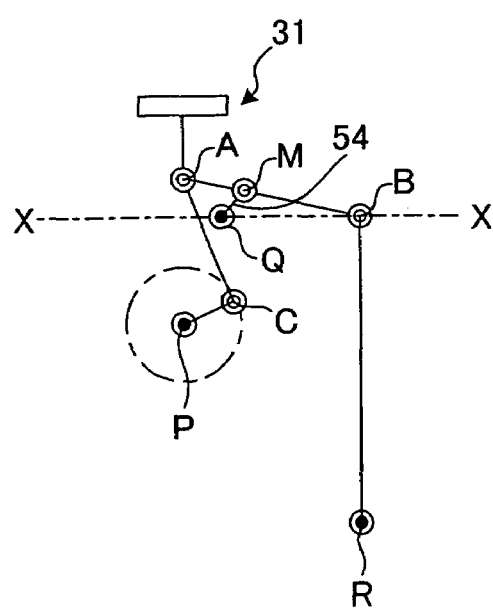

FIG. 17A to FIG. 17C are schematic diagrams for explaining modifications of the piston-crank mechanism. The mechanism of FIG. 17A is obtained by arranging the vertical link 56 as shown in FIG. 5A to FIG. 5C in the upper side of the joint B, and the rest part of the structure is the same as that of the first embodiment. The same effect as that of the first embodiment can be obtained by using the mechanism of FIG. 17A.

The mechanism of FIG. 17B is obtained by moving the fulcrum Q of the mechanism as shown in FIG. 5A to FIG. 5C toward the moving joint B and arranging it on the straight line that connects between the moving joint A (piston pin) and the fulcrum P (crankshaft), and the rest part of the structure is the same as that of the first embodiment. The mechanism of FIG. 17C is obtained by arranging the fulcrum Q on further right side. In the mechanisms of FIG. 17B and FIG. 17C, the length of the second horizontal link 54 is shorter than that of the first embodiment, and therefore, it is more compact than that of the mechanism of the first embodiment, which is advantageous. The mechanism of FIG. 17B has an advantage such that linearity is excellent as compared with the mechanisms of FIG. 17A and FIG. 17C.

As explained above, in the first embodiment and the modifications, by providing the approximate straight-line motion mechanism in the piston-crank mechanism, the lower end of the piston 31 moves on the approximate straight-line locus along the axial direction of the cylinder 32. Therefore, the straight-line motion precision of the piston 31 is high, which allows the side force of the piston 31 to be virtually zero. Consequently, even if the air bearing 48 with a low withstanding capacity in the thrust direction is provided between the piston 31 and the cylinder 32, no problem occurs.

In the grasshopper type approximate straight-line motion mechanism, a point moving along an approximate straight line (moving joint A) is leaning to a place near one end of the mechanism. Therefore, this mechanism is particularly suitable to restrict the motion of the piston of the Stirling engine 10, which makes it possible to obtain adequate linearity with the compact mechanism.

Figure 18:
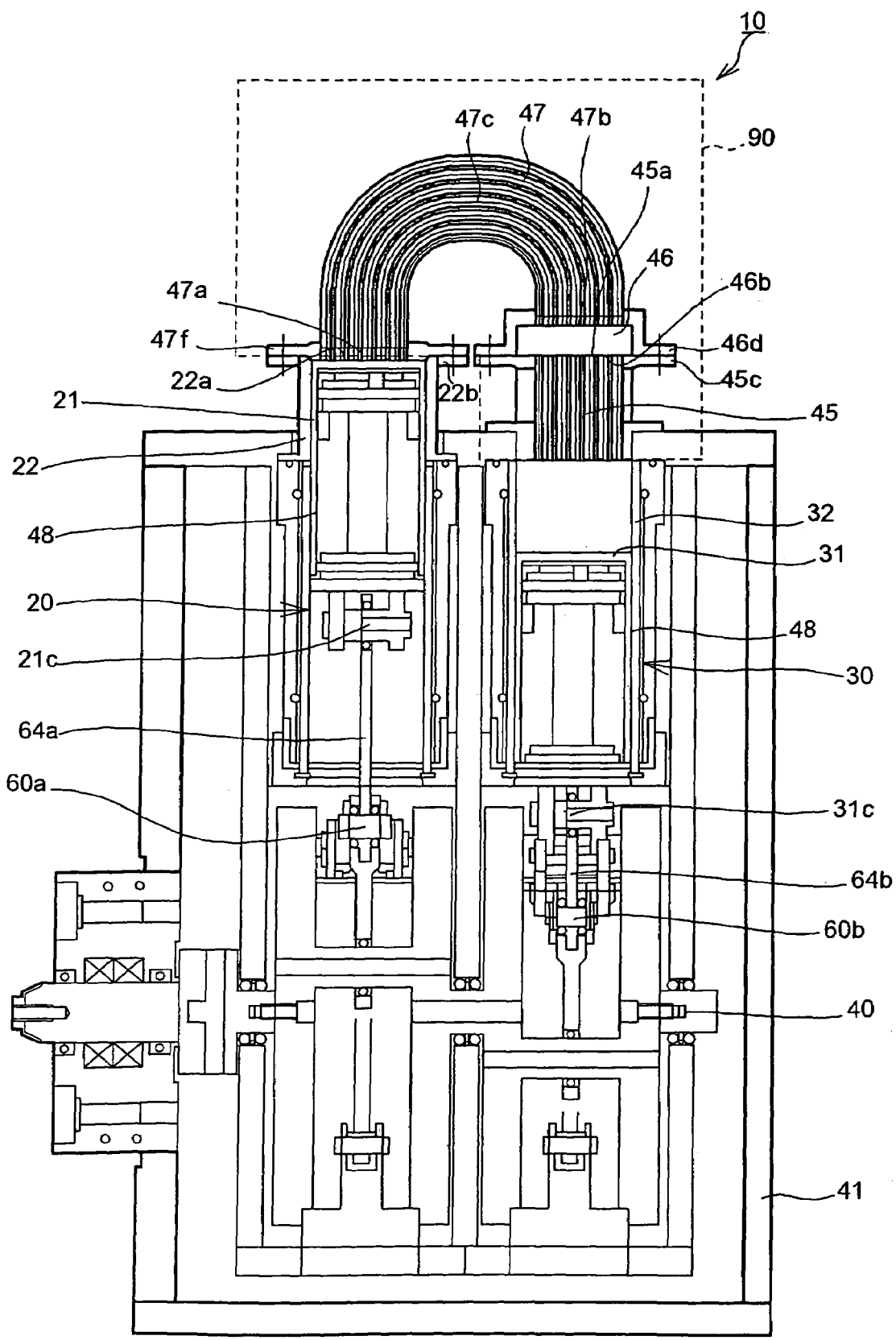
FIG. 18 is a front view of a Stirling engine according to a second embodiment of the present invention.
Figure 19:
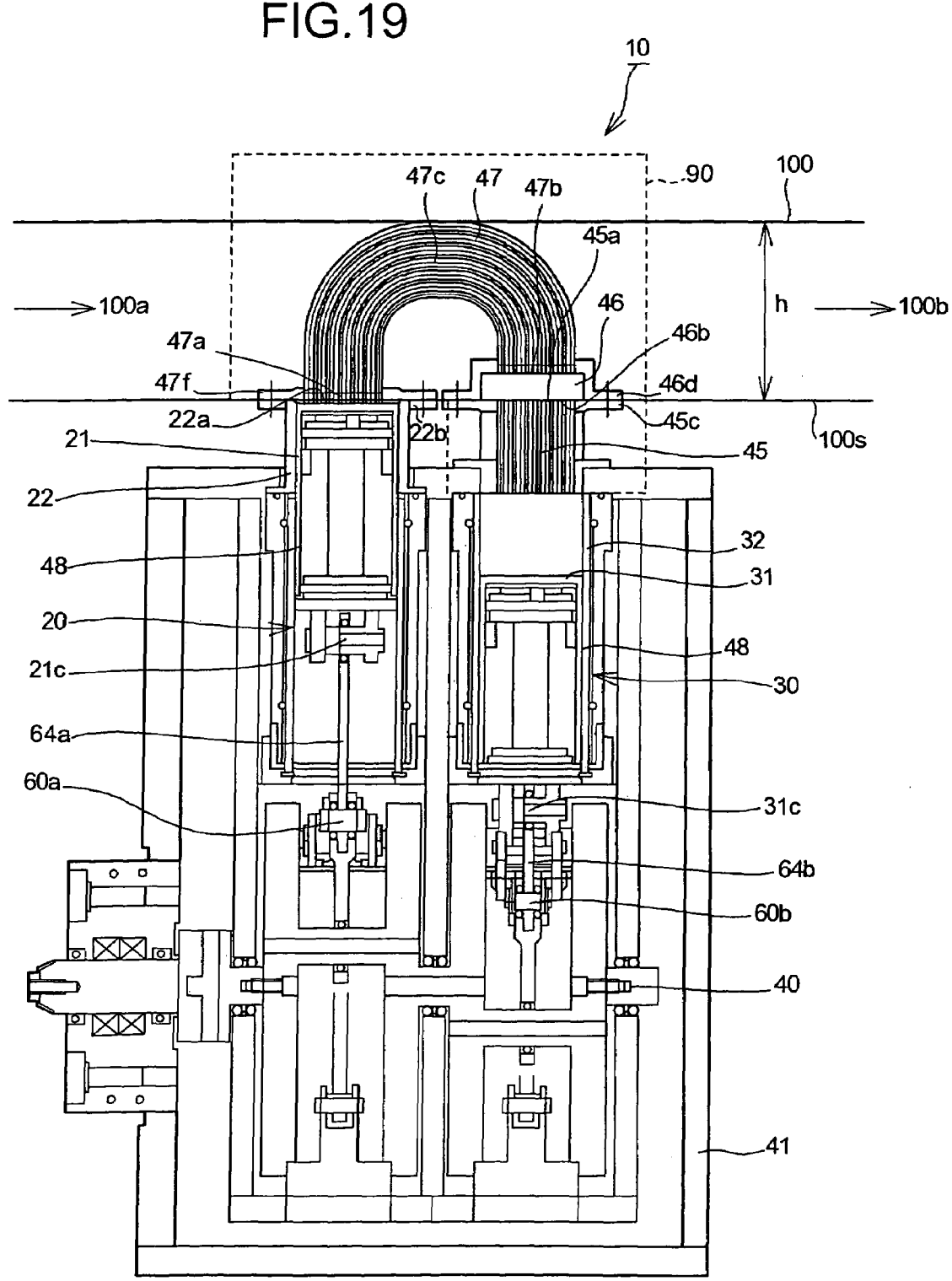
FIG. 19 is a front view for explaining how the Stirling engine shown in FIG. 18 is fixed to the exhaust pipe.

A second embodiment of the present invention is explained below with reference to FIG. 18. The same reference signs are assigned to components the same as those in the first embodiment. Therefore, detailed explanation thereof is omitted, and only the structure different from that of the first embodiment is explained below.

In the first embodiment, the regenerator 46 is arranged so as to be located outside the exhaust pipe 100 when the Stirling engine 10 is fixed to the fixing surface 100s of the exhaust pipe 100. On the other hand, in the second embodiment, the regenerator 46 together with the heater 47 is also accommodated inside the exhaust pipe 100. This is because the heat stored in the regenerator 46 is prevented from being cooled.

To accommodate the whole of the heater 47 and the regenerator 46 appropriately in the exhaust pipe 100, it is necessary to accommodate the central part 47c of the heater 47 within the exhaust pipe 100 and to fix the first end 47a of the heater 47 and a lower surface 46b of the regenerator 46 to the fixing surface 100s of the exhaust pipe 100. Consequently, the first end 47a of the heater 47 and the lower surface 46b of the regenerator 46 are located in the same plane as the fixing surface 100s. The first end 47a of the heater 47 is joined with the upper surface 22a of the high-temperature side cylinder 22 with no space between the two. The lower surface 46b of the regenerator 46 is joined with an upper surface 45a of the radiator 45 with no space between the two. Therefore, the upper surface 22a of the high-temperature side cylinder 22 is located in the same plane as the upper surface 45a of the radiator 45.

In the same manner as that of the first embodiment, the first end 47a of the heater 47 and the upper surface 22a of the high-temperature side cylinder 22 are fastened with the fastener so that the flange 47f and the flange 22b are joined with each other. Specifically, the flange 47f is provided in the first end 47a and the flange 22b is provided near the upper surface 22a of the high-temperature side cylinder 22. Likewise, the lower surface 46b of the regenerator 46 and the upper surface 45a of the radiator 45 are fastened with the fastener so that a flange 46d and a flange 45c are joined with each other. Specifically, the flange 46d is provided near the lower surface 46b of the regenerator 46 and the flange 45c is provided near the upper surface 45a of the radiator 45.

As explained above, because the upper surface 22a of the high-temperature side cylinder 22 is located in the same plane as the upper surface 45a of the radiator 45, the junction plane between the flange 47f and the flange 22b is located in the same plane as the junction plane between the flange 46d and the flange 45c. From this, for fixing the Stirling engine 10 to the fixing surface 100s of the exhaust pipe 100, all the flange 47f and the flange 22b including the fixing surface 100s are fastened with the fastener so that the two flanges are joined through the fixing surface 100s. Further, all the flange 46d and the flange 45c including the fixing surface 100s are fastened with the fastener so that the two flanges are joined through the fixing surface 100s. Consequently, the Stirling engine 10 can be easily fixed to the exhaust pipe 100.

It is explained above that by employing the structure in which the whole of the heater 47 and the regenerator 46 is accommodated appropriately in the exhaust pipe 100, the first end 47a of the heater 47 and the lower surface 46b of the regenerator 46 are located in the same plane as the fixing surface 100s and the upper surface 22a of the high-temperature side cylinder 22 is located in the same plane as the upper surface 45a of the radiator 45. However, even the following modification can be employed. That is, a portion to be heated more in the exhaust pipe 100 is the side of the high-temperature side cylinder 22 of the heater 47. Therefore, the first end 47a of the heater 47 needs to be located in the same plane as the fixing surface 100s so that the heater 47 is accommodated appropriately in the exhaust pipe 100. However, in the side of the low-temperature side cylinder 32 of the heater 47, a require for heating is relatively low. Therefore, the second end 47b of the heater 47 may be protruded to the outside of the exhaust pipe 100 if it is a slight amount. In other words, no trouble occurs even if the upper surface 45a of the radiator 45 is located lower than the upper surface 22a of the high-temperature side cylinder 22.

In the first and the second embodiments, the Stirling engine 10 is fixed to the exhaust pipe 100 so as to use the exhaust gas of the internal combustion engine for the vehicle as the heat source. However, the Stirling engine of the present invention is not limited to the above-mentioned type.

In order to efficiently receive the heat from the heat source and efficiently carry out heat exchange irrespective of types of the heat source, the heater desirably has each structure of the first and the second embodiments because heating area for receiving heat energy can be set as large as possible and at least the radiator can be installed in a place where it does not receive heat.

Particularly, when the exhaust heat is used, the heat energy is, in almost any cases, supplied as exhaust gas through the pipe. Furthermore, when the area where the heat can be received is limited like the inside of the pipe, the structures of the first and the second embodiments are excellent as a structure in which the heating area can be set as large as possible and at least the radiator can be installed in a place where it does not receive heat. The significance of the technology for the structures of the first and the second embodiments is further explained below.

As explained above, it is better that the invalid capacity (the radiator, the regenerator, and the heater) is smaller. However, if the invalid capacity includes a curved shape, channel resistance becomes high if there are a number of curved portions, and the channel resistance also becomes high if a curvature of the curved portion is low. In other words, considering the pressure loss of the working fluid, a single curved portion and high curvature are preferable. Concerning this point, the heater 47 of the first embodiment (or the heater 47 and the regenerator 46 of the second embodiment) is almost U-shaped, which is curved, but the number of curved portions is one.

As shown in FIG. 3, the curvature (curved shape) of the invalid capacity of the embodiments is set as follows. That is, the upper portions of the two cylinders 22 and 32 provided in the serial-parallel arrangement are joined. The internal dimension of the exhaust pipe 100 (height in the vertical direction) and the heights between the ends 47a, 47b of the heater 47 and the top of the central part 47c thereof are almost the same height h. The curvature is set so that the heater 47 fits in the height h. In order to ensure a large area that contacts the fluid heat source such as exhaust gas within a space limited such as the inside of the exhaust pipe 100, the above-mentioned curved shape is desirable.

From the viewpoint as explained above, the heater of the invalid capacity is accommodated in a limited space (heat-receiving space), like the inside of the exhaust pipe, that receives heat from the heat source so that the whole of the heater can be accommodated appropriately therein. A curved shape such as a U shape and a J shape may be formed in the heat-receiving space so that the heating area with heat from the heat source can be ensured at maximum and the channel resistance can be minimized.

In order to arrange the radiator 45 outside the heat-receiving space so as not to receive heat from the heat source while the channel resistance of the working fluid is minimized, the radiator 45 is linearly formed. More specifically, the radiator 45 is linearly formed in a location (in the same axis) corresponding to a location where there is a difference in height between the high-temperature side cylinder 22 and the low-temperature side cylinder 32, along the direction of extension (axial direction) of the low-temperature side cylinder 32.

In the same manner as that of the radiator 45, in order to arrange the regenerator 46 while the channel resistance of the working fluid is minimized, the regenerator 46 is linearly formed along the direction of extension of the low-temperature side cylinder 32. As explained as the difference between the first embodiment and the second embodiment, the regenerator 46 is decided whether it is accommodated in the heat-receiving space or it is arranged outside the heat-receiving space, depending on characteristics, a use environment, the purpose, or the like. When the regenerator 46 is arranged outside the heat-receiving space, it is arranged in the location corresponding to the location where there is the difference in height between the high-temperature side cylinder 22 and the low-temperature side cylinder 32.

As explained above, both of the regenerator 46 and the radiator 45 connected to the second end 47b of the heater 47 are provided along the direction of extension of the low-temperature side cylinder 32. The first end 47a of the heater 47 is connected to the upper part of the high-temperature side cylinder 22 with no space between the two. From this, at least the first end 47a and the second end 47b of the heater 47 have portions along each direction of extension of the high-temperature side cylinder 22 and the low-temperature side cylinder 32, respectively, and the central part 47c of the heater 47 has the curved shape.

From the technological reason, the heater 47 is formed in the shape such that it is turned in the middle of its length between the two cylinders 22 and 32. In other words, the heater 47 includes a portion in parallel with the axis of at least one cylinder 22 and a curved portion for connecting between the two cylinders 22 and 32 so as to connect between the two cylinders 22 and 32 that are provided in the serial-parallel arrangement.

A third embodiment of the present invention is explained below with reference to FIG. 20.

In the third embodiment, the same reference numerals as those in the first and the second embodiments are used. The detailed explanation is omitted and only a different point in terms of contents is explained below.

Figure 20:
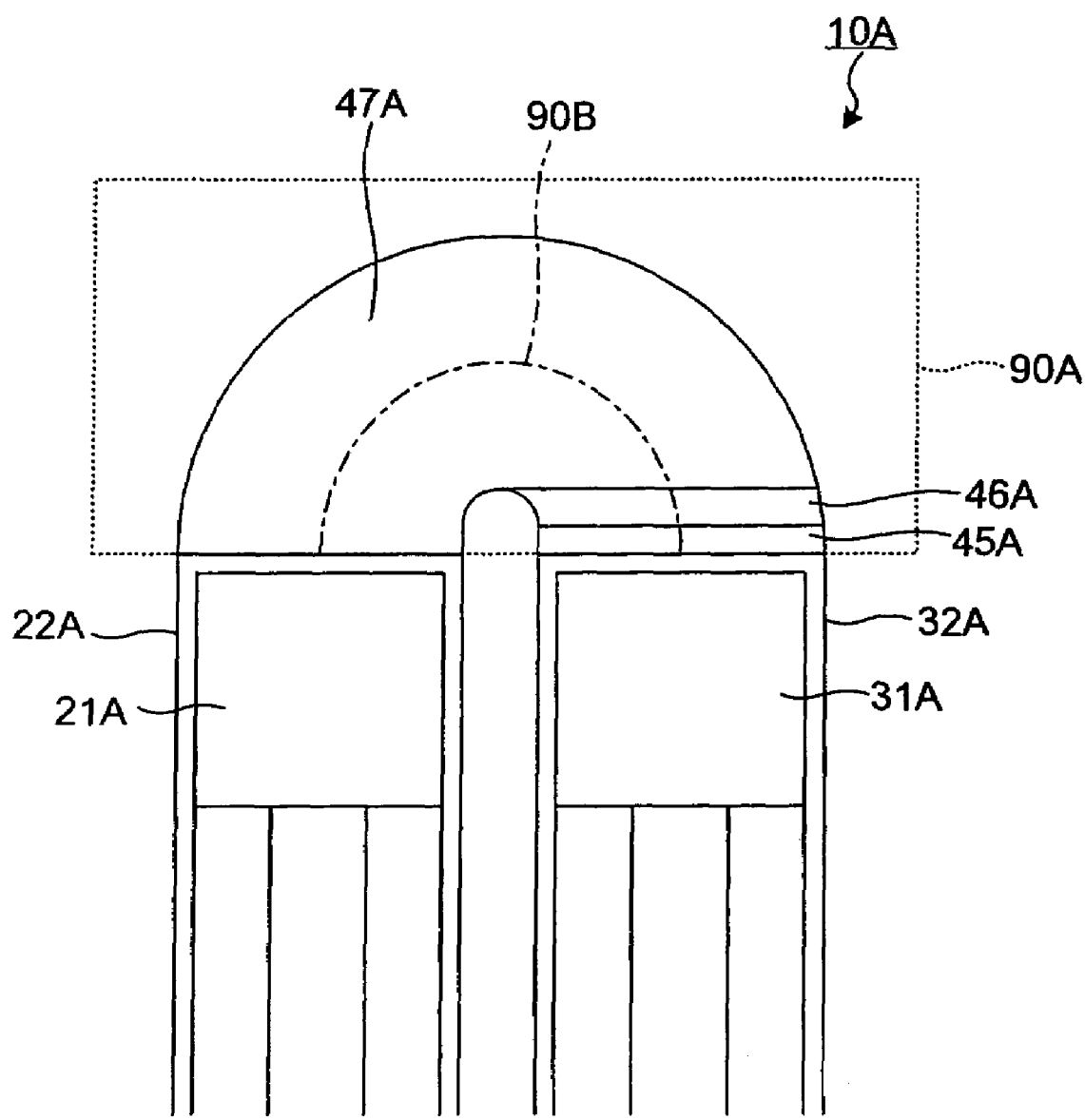
FIG. 20 is a front view of a Stirling engine according to a third embodiment of the present invention.
Figure 21:
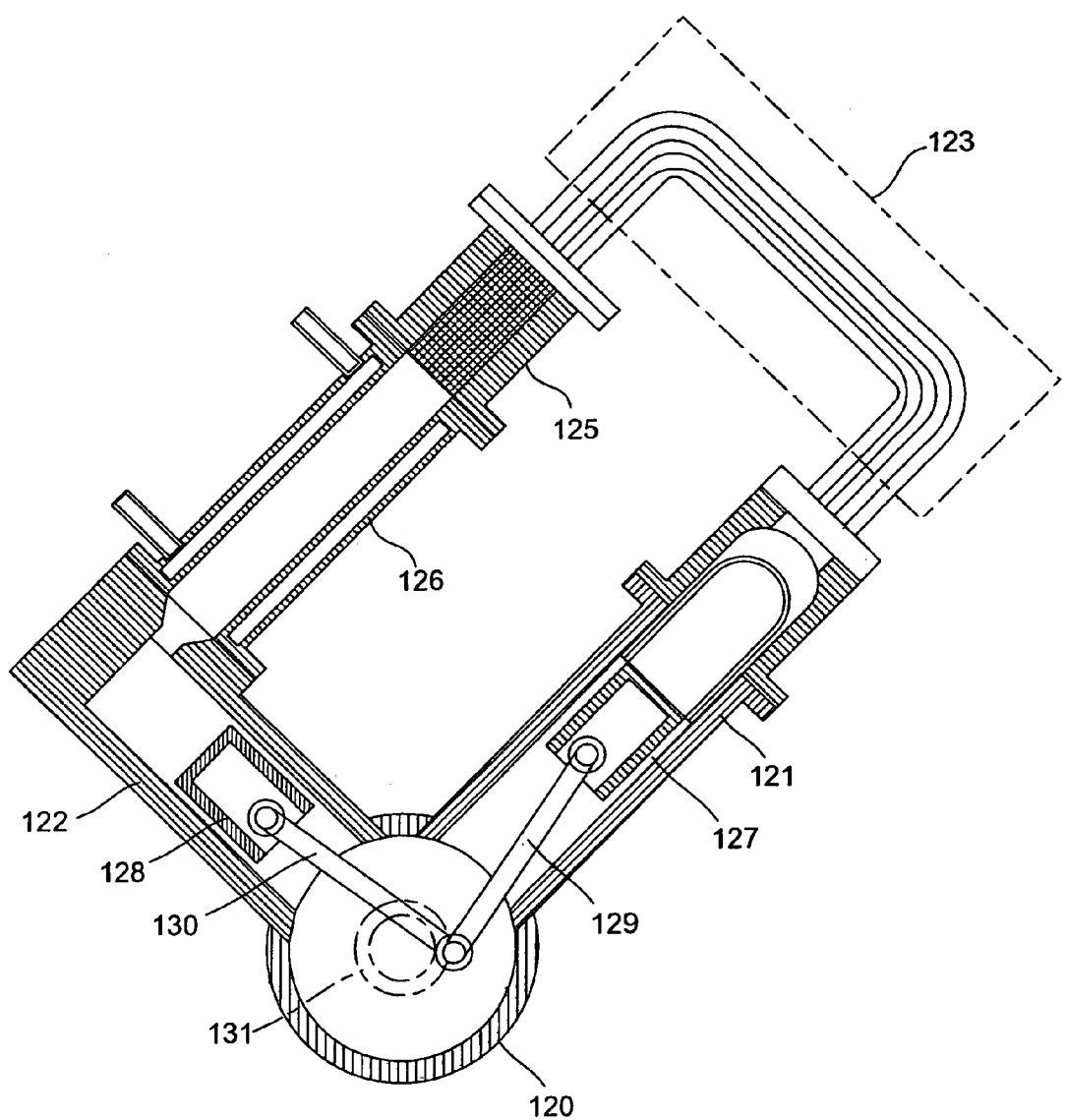
FIG. 21 is a partial cross-sectional view of a conventional Stirling engine.

FIG. 20 is a front view of a Stirling engine 10A according to the third embodiment. Cylinders 22A and 32A are provided in a serial-parallel arrangement. A heat exchanger 90A includes a radiator 45A, a regenerator 46A, and a heater 47A. At least a part of the heat exchanger 90A is formed in a curved shape so that the heat exchanger 90A connects between the two cylinders 22A and 32A. In the third embodiment, the positions of the top dead centers of an expansion piston 21A and a compression piston 31A are the same as each other.

In the third embodiment, even if the installation space is compact and the Stirling engine 10A is installed in a limited space, the degree of flexibility of installation increases. Furthermore, if an area where heat can be received is limited, the curved portion of the curved heater 47A is made to fit in the area. It is thereby possible to ensure the heating area as large as possible. The radiator 45A and the regenerator 46A are linearly formed along the direction of extension of the cylinder 32A. Therefore, the channel resistance of the working fluid can be reduced as compared with the shape such that the channel has a corner.

An axis 90B of the channel of the overall heat exchanger 90A is formed with only a curve. From the viewpoint of the channel resistance of the working fluid, the whole of the heat exchanger may be structured with a combination of a straight line and a curve according to the first and the second embodiments, or with only a curve as shown in the third embodiment. Therefore, in the heat exchanger, the axis of the channel is formed not with straight lines so as not to form any sharp corner in the channel.

According to one aspect of the present invention, in the Stirling engine, the first and the second cylinders are serially arranged, and at least a part of the heat exchanger is formed in a curved shape so as to connect between the first cylinder and the second cylinder. Therefore, the installation space is suppressed to be compact. Even if it is installed in a limited space like a vehicle, the degree of flexibility of installation increases. Furthermore, if the area where the heat can be received is limited like the inside of a pipe, the heating area can be ensured as large as possible if the heater has the curved shape in the area. If the radiator or the regenerator is formed in a curved shape, the channel resistance can be reduced as compared with the shape having a sharp corner. From the viewpoint of the channel resistance, the heat exchanger is formed so as not to include any sharp corner even at a part thereof. The axis of the channel of the heat exchanger may be formed with a combination of a curve and a straight line (see FIG. 1 and FIG. 18) or with only a curve (FIG. 20), not with a combination of straight lines, so as not to form a sharp corner therein.

Furthermore, by designing and arranging a curved portion of the heater correspondingly to the limited area where the heat can be received like in the inside of the pipe, the heating area can be ensured as large as possible in the area. The radiator and the regenerator are linearly structured along the direction of extension of the cylinder, which allows a reduced channel resistance.

Moreover, the radiator is arranged in a lower portion between the distances, which makes it easier to arrange the whole of the heater in an area where heat can be received and to arrange the radiator outside the area.

Furthermore, the Stirling engine can be realized with a simple structure.

Moreover, since the ends of the heater are provided in the same plane, if a surface is a heat-receiving area, the ends of the heater are arranged by being fitted over the surface, so that the whole of the heater can be accommodated appropriately in the heat-receiving area.

Furthermore, if a surface is made to be a heat-receiving area, by disposing one end of the heater by being fitted over the surface so that the whole of the heater is accommodated appropriately in the heat-receiving area, the regenerator is accommodated in the heat-receiving area. Therefore, the heat stored in the regenerator is not easily discharged to the outside.

Moreover, it is possible to provide a large contact area with exhaust gas inside the exhaust pipe.

Thus, in the Stirling engine of the present invention, the heater can effectively receive heat. Therefore, a highly efficient and compact Stirling engine can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A Stirling engine comprising:
    at least two cylinders, a first cylinder including a first piston and a second cylinder including a second piston, arranged in series;
    a drive shaft that connects the first piston and the second piston;
    a first connecting shaft that connects a piston pin, which is arranged on the first piston, and the first piston;
    a second connecting shaft that connects a piston pin, which is arranged on the second piston, and the second piston; and
    a heat exchanger that includes a radiator, a regenerator, and a heater, wherein:
        at least a part of the heat exchanger is formed in a curved shape so as to connect the first cylinder and the second cylinder,
        an output of the Stirling engine is taken out through the drive shaft,
        if a first distance is a distance between a top of the first piston and the drive shaft when the first piston is at top dead center, and a second distance is a distance between a top of the second piston and the drive shaft when the second piston is at top dead center, then the first distance is not equal to the second distance,
        a difference between the first distance and the second distance is equal to a difference between lengths of the first connecting shaft and the second connecting shaft, and the difference between the first distance and the second distance is by at least a length of the radiator.

2. The Stirling engine according to claim 1, wherein the heater is formed in the curved shape so as to connect the first cylinder and the second cylinder, and
the radiator and the regenerator are arranged along a direction in which any one of the first cylinder and the second cylinder extend.

3. The Stirling engine according to claim 1, wherein one of the two cylinders is a high temperature side cylinder, and a junction plane between the high temperature side cylinder and the heater is substantially in the same plane as a junction plane between the heater and the regenerator.

4. The Stirling engine according to claim 1, wherein one of the two cylinders is a high temperature side cylinder, and a junction plane between the high temperature side cylinder and the heater is in substantially the same plane as a junction plane between the regenerator and the radiator.

5. The Stirling engine according to claim 1, further comprising:
an approximate straight-line motion mechanism that is connected to at least one of the first piston of the first cylinder and the second piston of the second cylinder, and that performs an approximate straight-line motion when either of the first piston and the second piston reciprocates in the first cylinder and second cylinder, respectively.

6. The Stirling engine according to claim 1, wherein a top dead center position of the first piston is different than a top dead center position of the second piston.

7. The Stirling engine according to claim 1, wherein the difference between lengths of the connecting shafts corresponds to a difference in top dead center positions.

8. The Stirling engine according to claim 1, wherein the difference between the first distance and the second distance is by the length of the radiator.

9. A hybrid system comprising:
a Stirling engine including:
at least two cylinders, a first cylinder including a first piston and a second cylinder including a second piston, arranged in series;
a drive shaft that connects the first piston and the second piston;
a first connecting shaft that connects a piston pin, which is arranged on the first piston, and the first piston;
a second connecting shaft that connects a piston pin, which is arranged on the second piston, and the second piston; and
a heat exchanger that includes a radiator, a regenerator, and a heater, wherein:
at least a part of the heat exchanger is formed in a curved shape so as to connect the first cylinder and the second cylinder
an output of the Stirling engine is taken out through the drive shaft,
if a first distance is a distance between a top of the first piston and the drive shaft when the first piston is at top dead center, and a second distance is a distance between a top of the second piston and the drive shaft when the second piston is at top dead center, then the first distance is not equal to the second distance,
a difference between the first distance and the second distance is equal to a difference between lengths of the first connecting shaft and the second connecting shaft, and
the difference between the first distance and the second distance is by at least a length of the radiator; and
an internal combustion engine that drives a vehicle that includes an exhaust system, wherein:
the Stirling engine is mounted on the vehicle, and
the heater of the Stirling engine receives heat from the exhaust system.

10. The hybrid system according to claim 9, wherein the heat exchanger connects upper parts of the first cylinder and the second cylinder, and
the curved shape is set so as to fit in a size such that an internal diameter of an exhaust pipe of the internal combustion engine and a distance between an end of the heater and a top of the heater are substantially equal to each other.

11. The hybrid system according to claim 9, wherein one of the two cylinders is a high temperature side cylinder, and a junction plane between the high temperature side cylinder and the heater is substantially in the same plane as a junction plane between the heater and the regenerator.

12. The hybrid system according to claim 9, wherein one of the two cylinders is a high temperature side cylinder, and a junction plane between the high temperature side cylinder and the heater is in substantially the same plane as a junction plane between the regenerator and the radiator.

13. The hybrid system according to claim 9, further comprising:
an approximate straight-line motion mechanism that is connected to at least one of the first piston of the first cylinder and the second piston of the second cylinder, and that performs an approximate straight-line motion when either of the first piston and the second piston reciprocates in the first cylinder and second cylinder, respectively.

14. The hybrid system according to claim 9, wherein a top dead center position of the first piston is different than a top dead center position of the second piston.

15. The hybrid system according to claim 9, wherein the difference between lengths of the connecting shafts corresponds to a difference in top dead center positions.

16. The hybrid system according to claim 9, wherein the difference between the first distance and the second distance is by the length of the radiator.

* * * * *